US012396401B2

(12) United States Patent
Edo et al.

(10) Patent No.: US 12,396,401 B2
(45) Date of Patent: Aug. 26, 2025

(54) HARVESTING MACHINE, OBSTACLE DETERMINATION PROGRAM, RECORDING MEDIUM ON WHICH OBSTACLE DETERMINATION PROGRAM IS RECORDED, OBSTACLE DETERMINATION METHOD, AGRICULTURAL WORK MACHINE, CONTROL PROGRAM, RECORDING MEDIUM ON WHICH CONTROL PROGRAM IS RECORDED, AND CONTROL METHOD

(71) Applicant: Kubota Corporation, Osaka (JP)

(72) Inventors: Shunsuke Edo, Sakai (JP); Kenichi Iwami, Sakai (JP); Shunsuke Miyashita, Sakai (JP)

(73) Assignee: Kubota Corporation, Osaka (JP)

( * ) Notice: Subject to any disclaimer, the term of this patent is extended or adjusted under 35 U.S.C. 154(b) by 959 days.

(21) Appl. No.: 17/605,102

(22) PCT Filed: Apr. 24, 2020

(86) PCT No.: PCT/JP2020/017594
§ 371 (c)(1),
(2) Date: Jul. 12, 2022

(87) PCT Pub. No.: WO2020/218464
PCT Pub. Date: Oct. 29, 2020

(65) Prior Publication Data
US 2022/0346315 A1 Nov. 3, 2022

(30) Foreign Application Priority Data

Apr. 25, 2019 (JP) .................................. 2019-083820
Jun. 14, 2019 (JP) .................................. 2019-111161

(51) Int. Cl.
A01D 75/18 (2006.01)
A01D 41/127 (2006.01)
(Continued)

(52) U.S. Cl.
CPC ......... A01D 75/185 (2013.01); A01D 41/127 (2013.01); A01D 41/141 (2013.01); A01D 57/04 (2013.01); G05D 1/0077 (2013.01)

(58) Field of Classification Search
CPC ...... A01D 57/04; A01D 75/18; A01D 75/185; A01D 41/127; A01D 41/141
See application file for complete search history.

(56) References Cited

U.S. PATENT DOCUMENTS

2012/0262568 A1* 10/2012 Ruthenberg ......... A01B 69/001
348/148
2015/0305239 A1* 10/2015 Jung .................... A01D 41/141
701/50
(Continued)

FOREIGN PATENT DOCUMENTS

CN 108958263 A 12/2018
EP 1709859 A1 * 10/2006 ........... A01D 41/141
(Continued)

Primary Examiner — Adam J Behrens
(74) Attorney, Agent, or Firm — The Webb Law Firm

(57) ABSTRACT

A harvesting machine includes: a machine main body; a harvesting unit provided forward of the machine main body and capable of swinging upward and downward relative to the machine main body; a height detection unit capable of detecting a height position at which the harvesting unit is located; and an obstacle detection unit capable of detecting an obstacle located forward thereof in a travel direction. The obstacle detection unit includes: a first sensor and a second sensor provided at different positions in a vertical direction, and output detection information regarding a detection area located forward thereof in the travel direction; a selection unit that selects at least either the detection information from (Continued)

the first sensor or the detection information from the second sensor based on the height position of the harvesting unit and a determination unit that determines the obstacle based on the detection information selected by the selection unit.

8 Claims, 14 Drawing Sheets

(51) Int. Cl.
*A01D 41/14* (2006.01)
*A01D 57/04* (2006.01)
*G05D 1/00* (2006.01)

(56) References Cited

U.S. PATENT DOCUMENTS

| | | | |
|---|---|---|---|
| 2016/0104379 A1* | 4/2016 | Reinards | G08G 1/165 |
| | | | 340/435 |
| 2017/0088132 A1* | 3/2017 | Sagemueller | B60W 50/14 |
| 2018/0084708 A1* | 3/2018 | Neitemeier | A01B 69/001 |
| 2020/0317114 A1* | 10/2020 | Hoff | B60Q 1/085 |

FOREIGN PATENT DOCUMENTS

| | | | |
|---|---|---|---|
| JP | 2107911 A | 8/1990 |
| JP | 2006201829 A | 8/2006 |
| JP | 2017169539 A | 9/2017 |
| JP | 2018196349 A | 12/2018 |
| JP | 2019129760 A | 8/2019 |

* cited by examiner

HARVESTING MACHINE, OBSTACLE DETERMINATION PROGRAM, RECORDING MEDIUM ON WHICH OBSTACLE DETERMINATION PROGRAM IS RECORDED, OBSTACLE DETERMINATION METHOD, AGRICULTURAL WORK MACHINE, CONTROL PROGRAM, RECORDING MEDIUM ON WHICH CONTROL PROGRAM IS RECORDED, AND CONTROL METHOD

CROSS-REFERENCE TO RELATED APPLICATIONS

This application is the United States national phase of International Application No. PCT/JP2020/017594 filed Apr. 24, 2020, and claims priority to Japanese Patent Application Nos. 2019-083820 filed Apr. 25, 2019, and 2019-111161, filed Jun. 14, 2019, the disclosures of which are hereby incorporated by reference in their entirety.

BACKGROUND OF THE INVENTION

Field of the Invention

The present invention relates to a harvesting machine that includes: a harvesting unit that is provided forward of a machine main body and is capable of swinging upward and downward relative to the machine main body; and an obstacle detection unit that is capable of detecting an obstacle that is located forward thereof in a travel direction.

The present invention also relates to an agricultural work machine that includes an imaging device that faces toward a cultivated land.

Description of Related Art

For example, the harvesting machine (the "combine" in the document) disclosed in JP 2017-169539A (Patent Document 1) is provided with an obstacle detection unit ("ultrasonic sensor" in the document), and the obstacle detection unit is a sensor that outputs detection information regarding a detection area that is located forward thereof in the travel direction.

JP H2-107911U (Patent Document 2) discloses an agricultural work machine ("combine" in Patent Document 1) that is capable of automatically travelling.
Patent Document 1: JP 2017-169539A
Patent Document 2: JP H2-107911U

SUMMARY OF THE INVENTION

A problem corresponding to Patent Document 1 is as follows.

With the configuration in which the harvesting unit is provided on a front portion of a machine main body so as to be able to swing upward and downward, it may be impossible to desirably detect an obstacle that is located forward thereof, using a sensor, depending on the height of the harvesting unit. Therefore, the present invention aims to provide a harvesting machine that can accurately detect an obstacle that is located forward thereof in the travel direction, regardless of the height position of the harvesting unit.

A problem corresponding to Patent Document 2 is as follows.

Patent Document 2 does not disclose detecting an obstacle that is located around the machine body. Here, it is conceivable that the agricultural work machine disclosed in Patent Document 2 is configured to provide the agricultural work machine with an imaging device that faces toward the cultivated land, and detect an obstacle around the machine body based on an image captured by the imaging device.

However, with such a configuration, when fog or dust has been generated, it is conceivable that the captured image is unclear. When the captured image is unclear, it is conceivable that accuracy in obstacle detection will be low.

An objective of the present invention is to provide an agricultural work machine with a desirable accuracy in obstacle detection.

A harvesting machine according to the present invention includes: a machine main body; a harvesting unit that is provided forward of the machine main body and is capable of swinging upward and downward relative to the machine main body; a height detection unit that is capable of detecting a height position at which the harvesting unit is located; and an obstacle detection unit that is capable of detecting an obstacle that is located forward thereof in a travel direction, wherein the obstacle detection unit includes: a first sensor and a second sensor that are provided at different positions in a vertical direction, and output detection information regarding a detection area that is located forward thereof in the travel direction; a selection unit that selects at least either the detection information from the first sensor or the detection information from the second sensor based on the height position of the harvesting unit; and a determination unit that determines the obstacle based on the detection information selected by the selection unit.

According to the present invention, a plurality of sensors that detect a detection area that is located forward thereof in the travel direction are distributed in a vertical direction. Therefore, it is possible to realize a configuration with which, even if an obstacle that is located forward thereof is not desirably detected by one of the first sensor and the second sensor due to the height position of the harvesting unit, the obstacle can be desirably detected by the other of the first sensor and the second sensor. Also, according to the present invention, even in a case where whether or not each of the sensors at different heights can accurately detect an obstacle that is located forward thereof in the travel direction depends on the height position of the harvesting unit, one of the pieces of detection information from these sensors is selected by the selection unit. That is to say, a sensor that can accurately detect an obstacle that is located forward thereof in the travel direction is selected from among the plurality of sensors, based on the height position of the harvesting unit. As a result, it is possible to realize a harvesting machine that can accurately detect an obstacle that is located forward thereof in the travel direction, regardless of the height position of the harvesting unit.

In the present invention, it is preferable that the first sensor and the second sensor are each provided on the machine main body, and the selection unit selects the detection information from whichever one of the first sensor and the second sensor that is located at a lower position when the height position of the harvesting unit is higher than a preset height position that has been determined in advance, and selects the detection information from the other of the first sensor and the second sensor that is located at a higher position when the height position of the harvesting unit is lower than the preset height position.

With this configuration, the first sensor and the second sensor are distributed in the vertical direction on the machine main body, and therefore the first sensor and the second sensor are each firmly supported on the machine main body. The harvesting unit is provided forward of the machine main body, and therefore, with the configuration in which the first sensor and the second sensor are provided on the machine main body, there is the possibility of the harvesting unit occupying the detection area of the first sensor or the detection area of the second sensor. According to the present invention, based on the preset height position, the detection information from the sensor located higher is selected when the height position of the harvesting unit is low, and the detection information from the sensor located lower is selected when the height position of the harvesting unit is high. As a result, the determination unit can desirably determine an obstacle that is located forward thereof. Note that the wording "when the height position of the harvesting unit is higher than a preset height position that has been determined in advance" according to the present invention may also mean that "when the height position of the harvesting unit is no lower than a preset height position that has been determined in advance". Similarly, the wording "when the height position of the harvesting unit is lower than the preset height position" according to the present invention may also mean that "when the height position of the harvesting unit is no higher than the preset height position".

In the present invention, it is preferable that the first sensor and the second sensor are each provided on the machine main body, the harvesting unit includes a harvesting header that is capable of swinging upward and downward relative to the machine main body, a shoveling reel that is capable of swinging upward and downward relative to the harvesting header, and the selection unit selects at least either the detection information from the first sensor or the detection information from the second sensor based on a height position of the harvesting header and a height position of the shoveling reel.

If the detection information from the first sensor or the detection information from the second sensor is selected by the selection unit based only on the height position of the harvesting header without taking the height position of the shoveling reel into consideration, there is the possibility of the shoveling reel occupying the detection area of the first sensor or the detection area of the second sensor, and the determination unit being unable to desirably detect an obstacle that is located forward thereof. With the stated configuration, the selection unit selects at least either the detection information from the first sensor or the detection information from the second sensor, taking the height position of the harvesting header and the height position of the shoveling reel into consideration. For example, even when the height position of the harvesting header is high, if the height position of the shoveling reel relative to the harvesting header is low, it may be possible to accurately detect an obstacle that is located forward in the travel direction, based on the detection information from whichever of the first sensor or the second sensor that is located higher. That is to say, with this configuration, the selection unit can select at least either the first sensor or the second sensor to avoid the harvesting header and the shoveling reel located forward, as much as possible. Therefore, even if the shoveling reel swings upward and downward relative to the harvesting header, it is possible to realize a configuration for using a different sensor of a plurality of sensors based on the height position of the harvesting unit, and the determination unit can desirably determine an obstacle that is located forward thereof.

In the present invention, it is preferable that the first sensor and the second sensor are each provided on the machine main body, the harvesting unit includes a harvesting header that is capable of swinging upward and downward relative to the machine main body, a shoveling reel that is capable of changing a position thereof forward and rearward relative to the harvesting header, and the selection unit selects at least either the detection information from the first sensor or the detection information from the second sensor based on a height position of the harvesting header and a position of the shoveling reel in a front-rear direction.

In the configuration in which the shoveling reel is capable of changing the position thereof forward and rearward relative to the harvesting header, if the position of the shoveling reel is changed in a front-rear direction, the separation distance between the shoveling reel and the first sensor and the second sensor provided on the machine main body changes. In this case, there is the possibility of the shoveling reel occupying the detection area of the first sensor or the detection area of the second sensor as a result of the shoveling reel approaching the first sensor or the second sensor. With the stated configuration, the selection unit selects at least either the detection information from the first sensor or the detection information from the second sensor, taking the height position of the harvesting header and the position of the shoveling reel in the front-rear direction into consideration. For example, it is conceivable that the proportion of the detection area that is occupied by the shoveling reel, of the detection area of the first sensor and the detection area of the second sensor, decreases as the shoveling reel is located further forward. That is to say, with this configuration, the selection unit can select the first sensor or the second sensor to avoid the harvesting header and the shoveling reel located forward, as much as possible. Therefore, even if the shoveling reel changes the position thereof in the front-rear direction relative to the harvesting header, the selection unit can select a different sensor of a plurality of sensors based on the position of the shoveling reel in the front-rear direction, and the determination unit can desirably determine an obstacle that is located forward thereof.

In the present invention, it is preferable that the first sensor and the second sensor are each provided on the harvesting unit, and at least either the first sensor or the second sensor is configured to be able to change a sensing direction thereof based on the height position of the harvesting unit.

In a configuration in which the first sensor and the second sensor are each provided on the harvesting unit, the first sensor and the second sensor each incline upward and downward as the harvesting unit swings upward and downward. Therefore, the respective detection areas of the first sensor and the second sensor may be shifted upward relative to the forward direction in the travel direction, or downward relative to the forward direction in the travel direction. In this configuration, at least either the first sensor or the second sensor is configured so that the sensing direction thereof is adjustable. As a result, at least either the first sensor or the second sensor can maintain the detection area thereof so as to be located forward in the travel direction, regardless of the upward and downward swing of the harvesting unit. As a result, the obstacle detection unit can accurately detect an obstacle that is located forward thereof in the travel direction, regardless of the height position of the harvesting unit.

Another aspect of the present invention is an obstacle determination program for a harvesting machine that includes: a machine main body; a harvesting unit that is provided forward of the machine main body and is capable of swinging upward and downward relative to the machine main body; and a first sensor and a second sensor that are provided at different positions in a vertical direction, and each output detection information regarding a detection area that is located forward thereof in a travel direction, wherein the obstacle determination program is configured to enable a computer to realize: a height detection function of detecting a height position at which the harvesting unit is located; and an obstacle detection function of detecting an obstacle that is located forward in the travel direction, and the obstacle detection function includes: a selecting function of selecting at least either the detection information from the first sensor or the detection information from the second sensor based on the height position of the harvesting unit; and a determining function of determining the obstacle based on the detection information selected using the selecting function.

Another aspect of the present invention is a recording medium on which an obstacle determination program is recorded, the obstacle determination program being for a harvesting machine that includes: a machine main body; a harvesting unit that is provided forward of the machine main body and is capable of swinging upward and downward relative to the machine main body; and a first sensor and a second sensor that are provided at different positions in a vertical direction, and each output detection information regarding a detection area that is located forward thereof in a travel direction, wherein the obstacle determination program recorded on the recording medium enables a computer to realize: a height detection function of detecting a height position at which the harvesting unit is located; and an obstacle detection function of detecting an obstacle that is located forward in the travel direction, and the obstacle detection function includes: a selecting function of selecting at least either the detection information from the first sensor or the detection information from the second sensor based on the height position of the harvesting unit; and a determining function of determining the obstacle based on the detection information selected using the selecting function.

Another aspect of the present invention is an obstacle determination method for a harvesting machine that includes: a machine main body; a harvesting unit that is provided forward of the machine main body and is capable of swinging upward and downward relative to the machine main body; and a first sensor and a second sensor that are provided at different positions in a vertical direction, and each output detection information regarding a detection area that is located forward thereof in a travel direction, the obstacle determination method including: a height detection step of detecting a height position at which the harvesting unit is located; and an obstacle detecting step of detecting an obstacle that is located forward in the travel direction, wherein the obstacle detection step includes: a selecting step of selecting at least either the detection information from the first sensor or the detection information from the second sensor based on the height position of the harvesting unit; and a determining step of determining the obstacle based on the detection information selected in the selecting step.

[2] The following is a means for solving the problem corresponding to Problem [2].

One aspect of the present invention is an agricultural work machine that is capable of automatically travelling, including: an imaging device that faces toward a cultivated land; a detection device that is a sensor of a type different from the imaging device, and faces toward the cultivated land; an obstacle detection unit that detects an obstacle around a machine body based on at least either an image captured by the imaging device or a result of detection by the detection device; and an apparatus control unit that controls a predetermined apparatus, wherein, when an obstacle is detected by the obstacle detection unit, the apparatus control unit performs at-detection control that is control to be performed upon an obstacle being detected.

According to the present invention, in a situation where accuracy in obstacle detection that is based only on the image captured by the imaging device is likely to be low, such as when the image captured by the imaging device is unclear, for example, it is possible to detect an obstacle around the machine body based on the result of the detection by the detection device.

Therefore, according to the present invention, it is possible to realize an agricultural work machine with which accuracy in obstacle detection is less likely to be low when accuracy in obstacle detection that is based only on a captured image is likely to be low.

That is to say, the present invention can realize an agricultural work machine with a desirable obstacle detection accuracy.

In addition, with the present invention, it is possible to realize an agricultural work machine that performs appropriate control when an obstacle is detected.

Furthermore, in the present invention, it is preferable that the obstacle detection unit includes a first detector that detects an obstacle around a machine body based on an image captured by the imaging device, and a second detector that detects an obstacle around the machine body based on a result of detection by the detection device, when an obstacle is not detected by the first detector and an obstacle is not detected by the second detector, the obstacle detection unit does not output a signal indicating that an obstacle is detected, when an obstacle is detected by only either the first detector or the second detector, the obstacle detection unit outputs a signal indicating that an obstacle is detected, and when an obstacle is detected by both the first detector and the second detector, the obstacle detection unit outputs a signal indicating that an obstacle is detected.

With this configuration, if an obstacle is detected by only one of the first detector and the second detector, the obstacle detection unit outputs a signal indicating that an obstacle is detected. Therefore, compared to the configuration with which a signal indicating that an obstacle is detected is not output when only one of the first detector and the second detector detects an obstacle, it is possible to reduce false-negative detection by the obstacle detection unit.

Furthermore, in the present invention, it is preferable that the agricultural work machine further includes a state determination unit that determines whether or not an image capturing state of the imaging device is normal, wherein, when the state determination unit determines that the image capturing state of the imaging device is not normal, the obstacle detection unit detects an obstacle around the machine body based on a result of detection by the detection device.

With this configuration, when the image capturing state of the imaging device is not normal, obstacle detection is performed based on the result of the detection by the detection device. Therefore, with this configuration, it is possible to realize an agricultural work machine with which an obstacle detection accuracy is less likely to decrease even if the image capturing state of the imaging device is not normal.

Furthermore, in the present invention, it is preferable that the state determination unit determines whether or not the image capturing state of the imaging device is normal based on at least either a value indicating the image capturing state of the imaging device and an image captured by the imaging device.

With this configuration, it is easier for the state determination unit to accurately detect whether or not the image capturing state of the imaging device is normal. As a result, it is possible to realize an agricultural work machine that can more reliably perform obstacle detection based on the results of the detection by the detection device when the image capturing state of the imaging device is not normal.

Furthermore, in the present invention, it is preferable that the detection device is a temperature distribution sensor that detects a temperature distribution in a field of view.

With this configuration, in a situation where accuracy in obstacle detection that is based only on the image captured by the imaging device is likely to be low, such as when the image captured by the imaging device is unclear, for example, it is possible to accurately detect an obstacle around the machine body based on the result of the detection by the temperature distribution sensor.

Furthermore, in the present invention, it is preferable that the detection device is a short-wavelength infrared sensor that detects short-wavelength infrared light.

With this configuration, in a situation where accuracy in obstacle detection that is based only on the image captured by the imaging device is likely to be low, such as when the image captured by the imaging device is unclear, for example, it is possible to accurately detect an obstacle around the machine body based on the result of the detection by the short-wavelength infrared sensor.

Furthermore, in the present invention, it is preferable that the obstacle detection unit includes a first detector that detects an obstacle around the machine body based on an image captured by the imaging device, and the first detector detects an obstacle around the machine body, using a neural network learned through deep learning.

With this configuration, it is possible to accurately perform obstacle detection based on an image captured by the imaging device, using a neural network learned through deep learning.

Furthermore, in the present invention, it is preferable that the obstacle detection unit includes a second detector that detects an obstacle around the machine body based on a result of detection by the detection device, and the second detector detects an obstacle around the machine body, using a neural network learned through deep learning.

With this configuration, it is possible to accurately perform obstacle detection based on the result of the detection by the detection device, using a neural network learned through deep learning.

Another aspect of the present invention is a control program for an agricultural work machine that is capable of automatically travelling, and includes: an imaging device that faces toward a cultivated land; and a detection device that is a sensor of a type different from the imaging device, and faces toward the cultivated land, wherein the control program is configured to enable a computer to realize: an obstacle detection function of detecting an obstacle around a machine body of the agricultural work machine based on at least either an image captured by the imaging device or a result of detection by the detection device; and an apparatus control function of controlling a predetermined apparatus in the agricultural work machine, and when an obstacle is detected by the obstacle detection function, the apparatus control function performs at-detection control that is control to be performed upon an obstacle being detected.

Another aspect of the present invention is a recording medium on which a control program is recorded, the control program being for an agricultural work machine that is capable of automatically travelling, and includes: an imaging device that faces toward a cultivated land; and a detection device that is a sensor of a type different from the imaging device, and faces toward the cultivated land, wherein the control program enables a computer to realize: an obstacle detection function of detecting an obstacle around a machine body of the agricultural work machine based on at least either an image captured by the imaging device or a result of detection by the detection device; and an apparatus control function of controlling a predetermined apparatus in the agricultural work machine, and when an obstacle is detected by the obstacle detection function, the apparatus control function performs at-detection control that is control to be performed upon an obstacle being detected.

Another aspect of the present invention is a control method for an agricultural work machine that is capable of automatically travelling, and includes: an imaging device that faces toward a cultivated land; and a detection device that is a sensor of a type different from the imaging device, and faces toward the cultivated land, the control method including: an obstacle detection step of detecting an obstacle around a machine body of the agricultural work machine based on at least either an image captured by the imaging device or a result of detection by the detection device; and an apparatus control step of controlling a predetermined apparatus in the agricultural work machine, wherein, when an obstacle is detected in the obstacle detection step, at-detection control that is control to be performed upon an obstacle being detected is performed in the apparatus control step.

DETAILED DESCRIPTION OF PREFERRED EMBODIMENTS

First Embodiment

The following describes a first embodiment with reference to FIGS. 1 to 10.

Figure 1:
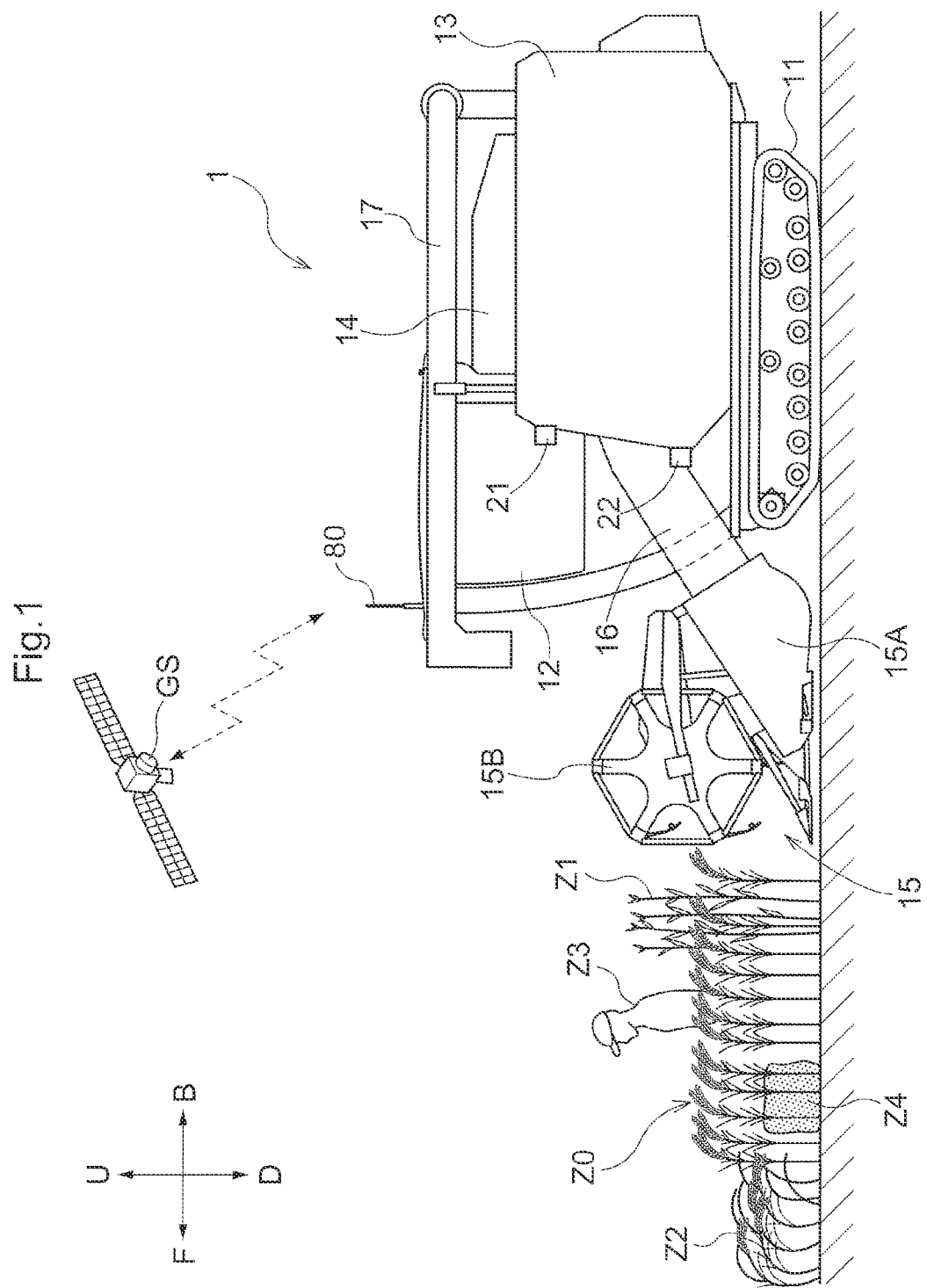
FIG. 1 is a diagram showing a first embodiment (the same applies up to FIG. 10), and is an overall side view of a harvesting machine.

The following describes an embodiment of a combine, which is an example of the harvesting machine according to the present invention, based on the drawings. In this embodiment, a front-rear direction of a machine main body 1 is defined in a travel direction of the machine body in a work state. In FIG. 1, the direction indicated by a sign (F) indicates the front side of the machine body, and the direction indicated by a sign (B) indicates the rear side of the machine body. The direction indicated by a sign (U) indicates the upper side of the machine body, and the direction indicated by a sign (D) indicates the lower side of the machine body. The direction toward the front side of the sheet of FIG. 1 indicates the left side of the machine body, and the direction toward the rear side of the sheet of FIG. 1 indicates the right side of the machine body. The left-right direction of the machine main body 1 is defined in a state where the machine main body 1 is viewed in a travel direction of the machine body.

Basic Configuration of Harvesting Machine

As shown in FIG. 1, a normal-type combine that is one embodiment of the harvesting machine includes the machine main body 1, a pair of left and right crawler-type travel apparatuses 11, a boarding section 12, a threshing apparatus 13, a grain tank 14, a harvesting unit 15, a conveying apparatus 16, and a grain discharge apparatus 17.

The travel apparatuses 11 are provided on a lower portion of the combine. The combine is self-propelled using the travel apparatuses 11. The boarding section 12, the threshing apparatus 13, and the grain tank 14 are provided on the upper side relative to the travel apparatuses 11, and are formed as an upper portion of the machine main body 1. An occupant of the combine or an observer who monitors the combine's work can board the boarding section 12. A satellite positioning module 80 is provided on the ceiling of the boarding section 12. The satellite positioning module 80 receives a GNSS (Global Navigation Satellite System) signal (including a GPS signal) from an artificial satellite GS and acquires the position of the combine itself. A drive engine (not shown) is provided below the boarding section 12. The grain discharge apparatus 17 is coupled to a lower rear portion of the grain tank 14.

The harvesting unit 15 is supported on a front portion of the machine main body 1. The conveying apparatus 16 is provided rearward of the harvesting unit 15 so as to be adjacent thereto. The harvesting unit 15 harvests crops in a cultivated land. The crops to be harvested are, for example, planted stalks of rice or the like, but may be of soybean, corn, or the like. The harvesting unit 15 and the conveying apparatus 16 are configured to be able to swing upward and downward about an axis that extends in a horizontal direction relative to the machine body, as a result of expansion and contraction of a hydraulic cylinder (not shown) that is provided so as to span between the machine main body 1 and the conveying apparatus 16. With this configuration, the harvesting unit 15 is configured to able to adjust the height relative to the ground when harvesting the crops in the cultivated land. The combine can perform work travel through which the combine travels using the travel apparatuses 11, while harvesting the crops in the cultivated land, using the harvesting unit 15.

The harvesting unit 15 is provided with a harvesting header 15A and a shoveling reel 15B. When harvesting crops from the cultivated land, the shoveling reel 15B shovels leading end-side portions of the crops rearward. The harvesting header 15A collects the crops harvested from the cultivated land (for example, reaped stalks) to a position of the harvesting unit 15 where the harvesting unit 15 communicates with the inside of the conveying apparatus 16. The harvesting header 15A is configured to be able to swing upward and downward relative to the machine main body 1, and swings integrally with the conveying apparatus 16. The shoveling reel 15B is configured to be able to swing upward and downward relative to the harvesting header 15A, and is configured to be able to change the position thereof forward and rearward relative to the harvesting header 15A.

The crops (for example, reaped stalks) harvested by the harvesting unit 15 are conveyed by the conveying apparatus 16 to the threshing apparatus 13. The harvested crops are subjected to threshing processing by the threshing apparatus 13. The harvested grains obtained through threshing processing are stored in the grain tank 14. The grains stored in the grain tank 14 are discharged to the outside of the machine by the grain discharge apparatus 17 when necessary. The grain discharge apparatus 17 is configured to be able to swing about a vertical axis that is located rearward of the machine body.

A first sensor 21 and a second sensor 22 are provided on a left end portion of the front wall of the threshing apparatus 13. Each of the first sensor 21 and the second sensor 22 is a sonar, for example, and a detection area thereof is located forward thereof in the travel direction. The first sensor 21 and the second sensor 22 are provided at different positions in the vertical direction, and the first sensor 21 is located at a higher position than the second sensor 22.

Various objects are present on the cultivated land as targets to be detected by the first sensor 21 and the second sensor 22. FIG. 1 schematically shows a normal planted stalk group that is indicated by a sign Z0, a weed group that is indicated by a sign Z1, a fallen stalk group that is indicated by a sign Z2, a person that is indicated by a sign Z3, and a stone that is indicated by a sign Z4, as such targets to be detected.

Configuration of Control Unit

Figure 2:
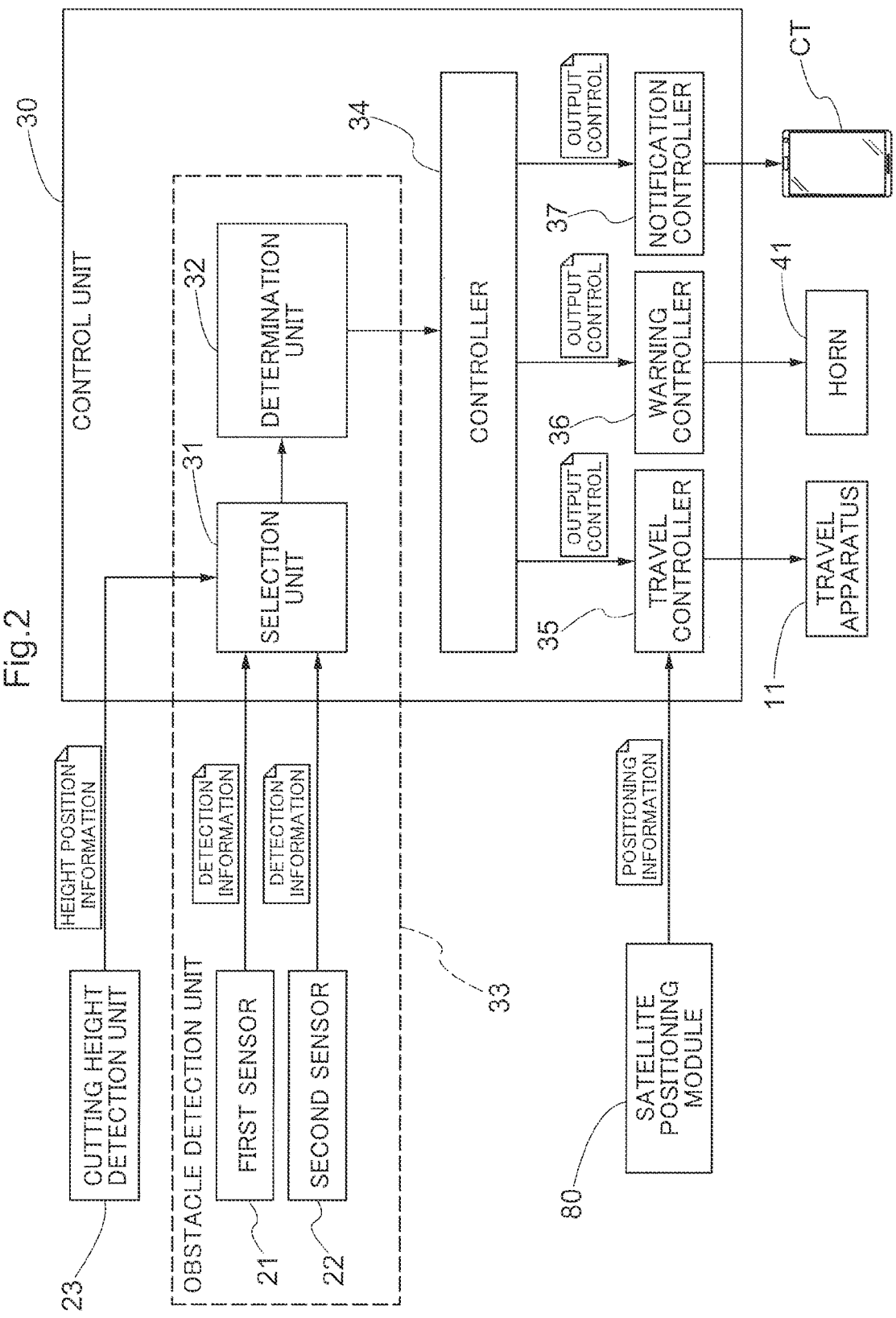
FIG. 2 is a functional block diagram showing a control system in the harvesting machine.

A control unit 30 shown in FIG. 2 is a core element of the combine control system, and is shown as an assembly of a plurality of ECUs. The control unit 30 includes a selection unit 31, a determination unit 32, a controller 34, a travel controller 35, a warning controller 36, and a notification controller 37. The selection unit 31 and the determination unit 32 also constitute a portion of an obstacle detection unit 33.

The obstacle detection unit 33 is configured to be able to detect an obstacle that is located forward of the combine in the travel direction. The obstacle detection unit 33 includes the first sensor 21, the second sensor 22, the selection unit 31, and the determination unit 32. Positioning information output from the satellite positioning module 80, pieces of detection information respectively output from the first sensor 21 and the second sensor 22, and height position information output from a cutting height detection unit 23, which corresponds to the "height detection unit" according to the present invention, are input to the control unit 30 through a wiring network. As described above, the harvesting unit 15 and the conveying apparatus 16 (see FIGS. 1, 4, and so on) are configured to be able to swing upward and downward. The cutting height detection unit 23 is provided at the swing axis of the conveying apparatus 16. The cutting height detection unit 23 is configured to be able to detect height position information regarding the harvesting unit 15 by detecting the swing angle of the conveying apparatus 16. The height position information regarding the harvesting unit 15 is information regarding a height position H (see FIG. 4 and so on) of the harvesting unit 15. In the present embodiment, the height position H is the height of the harvesting unit 15 relative to the ground. In the present embodiment, the first sensor 21 and the second sensor 22 are sonars, and therefore the pieces of detection information output from the first sensor 21 and the second sensor 22 are distance measuring information.

The determination unit 32 has the function of determining specific information of pieces of detection information transmitted from at least either the first sensor 21 or the second sensor 22 as indicating an obstacle, using a neural network learned through machine learning (deep learning) for example.

Although the details will be described later, the cutting height detection unit 23 detects the height position H of the harvesting unit 15 (see FIG. 4 and so on), and the selection unit 31 selects at least either the detection information from the first sensor 21 or the detection information from the second sensor 22 based on the height position H. In other words, the selection unit 31 is configured to be able to select one of the pieces of detection information respectively output from the first sensor 21 and the second sensor 22, based on the cutting height of the harvesting unit 15. The detection information selected by the selection unit 31, of the pieces of detection information respectively output from the first sensor 21 and the second sensor 22, is transmitted to the determination unit 32. As described above, the obstacle detection unit 33 is configured to be able to detect an obstacle that is located forward thereof in the travel direction.

The controller 34 determines a control pattern based on the type of the obstacle detected by the obstacle detection unit 33. Control patterns are stored in a ROM or the like in the form of a lookup table corresponding to the types of obstacles, for example, and the control pattern corresponding to the type of the obstacle is selected by the controller 34. An output control corresponding to the selected control pattern is output from the controller 34 to the travel controller 35, the warning controller 36, and the notification controller 37, respectively.

The travel controller 35 has an engine control function, a steering control function, a vehicle speed control function, and so on, and provides a travel control signal to the travel apparatuses 11. When the combine is manually operated, the travel controller 35 generates a control signal based on the operation input by the occupant, to control the travel apparatuses 11. When the combine is automatically operated, the travel controller 35 performs control regarding steering and the vehicle speed on the travel apparatuses 11, based on an automatic travel command provided from an automatic travel control module of the control unit 30 and positioning information received from the satellite positioning module 80. The travel controller 35 is configured to be able to output a deceleration command and a stop command to the travel apparatuses 11 based on output control from the controller 34.

The warning controller 36 is a module for notifying an animal or a person that is located in the path in front of the machine main body 1 shown in FIG. 1, of the state of work travel of the machine main body 1 and various warning, and is configured to be able to perform control of output to a horn 41. The horn 41 is provided at a given position on the machine main body 1. The notification controller 37 is configured to be able to output the control pattern determined by the controller 34 to a terminal CT such as a smartphone or a tablet computer, and the control pattern is displayed on the terminal CT. The terminal CT is to be carried by the occupant of the combine or the observer or manager of the cultivated land. The notification controller 37 is configured so that a person carrying the terminal CT can check the state and history of the control pattern on the terminal CT.

Selection of First Sensor and Second Sensor

Figure 3:
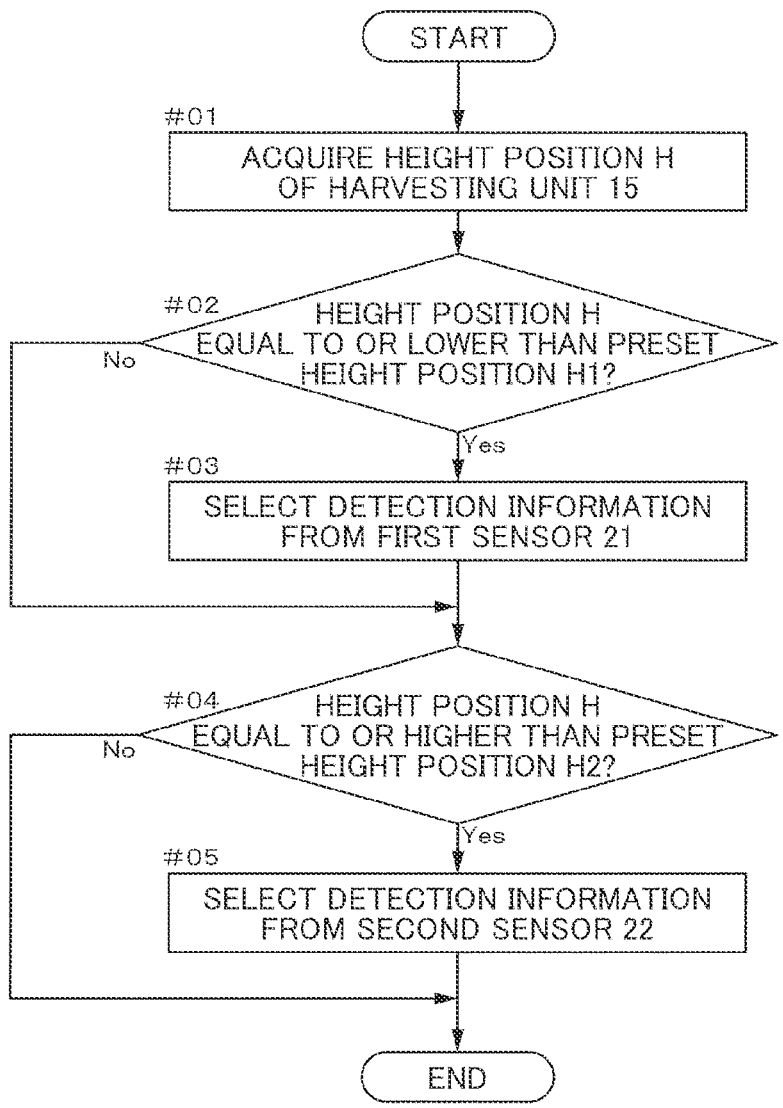
FIG. 3 is a flowchart showing processing that is performed by a selection unit.
Figure 4:
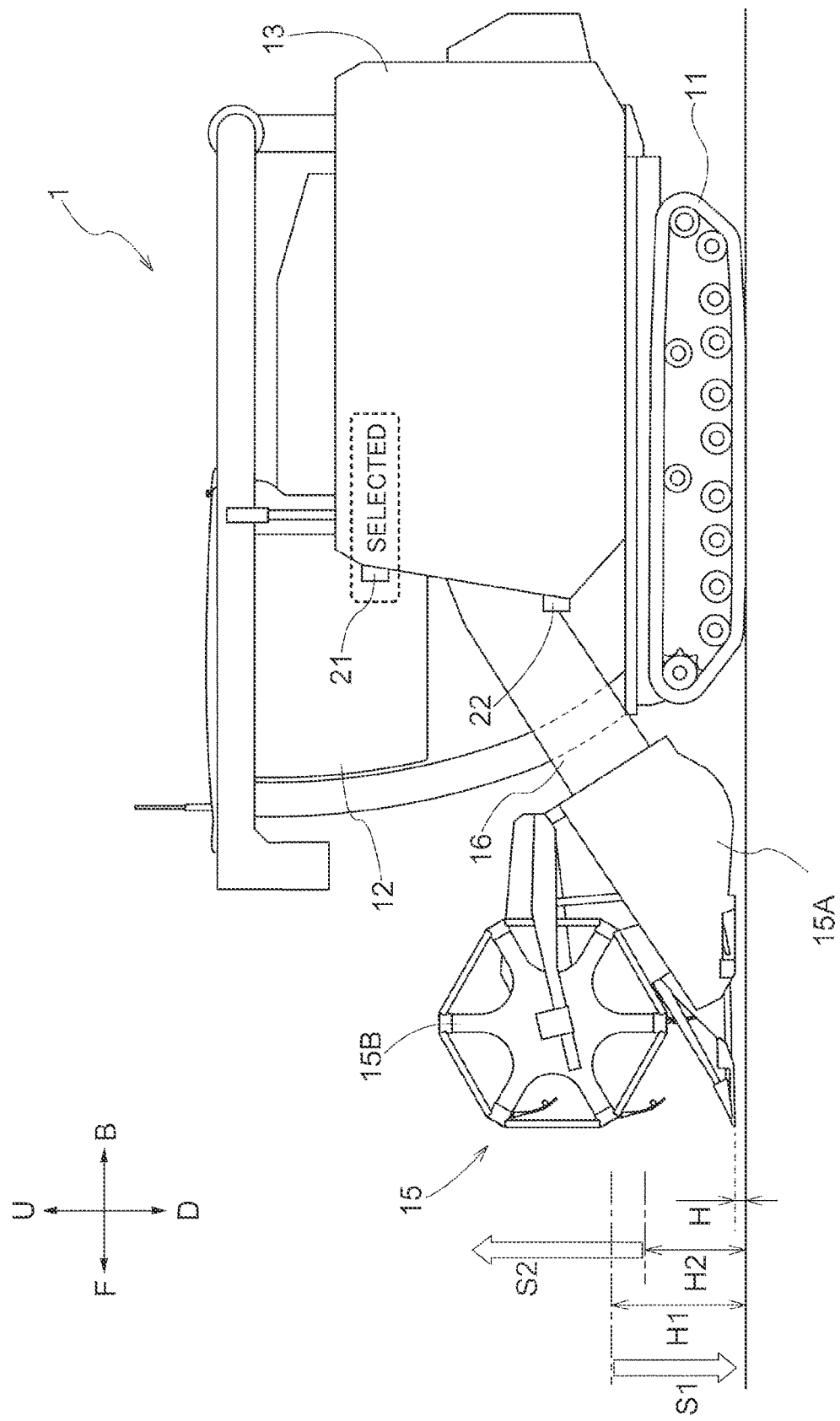
FIG. 4 is a side view showing selection between pieces of detection information respectively output from a first sensor and a second sensor, performed based on a height position of a harvesting unit.

As described above, the selection unit 31 shown in FIG. 2 is configured to select at least either the detection information from the first sensor 21 or the detection information from the second sensor 22 based on the height position H of the harvesting unit 15 shown in FIG. 4 and so on. FIG. 3 shows selection processing that is performed by the selection unit 31 to select between the detection information from the first sensor 21 and the detection information from the second sensor 22. The selection processing from the start to the end shown in FIG. 3 is performed in cycles that have a constant period.

The selection unit 31 acquires the height position H, which is the position of the harvesting unit 15 in the vertical direction (step #01). The height position H is height position information that is output from the cutting height detection unit 23 to the selection unit 31. After acquiring the height position H, the selection unit 31 determines whether or not the height position H is equal to or lower than a preset height position H1 (or is lower than the preset height position H1) that has been set in advance (step #02). If the height position H is no higher than the preset height position H1 (step #02: Yes), the selection unit 31 selects the detection information from the first sensor 21 (step #03). The height position of the first sensor 21 is higher than the height position of the second sensor 22. If the height position H is higher than the preset height position H1 (step #02: No), processing proceeds to step #04. The value of the preset height position H1 can be changed when necessary.

After completing the processing in step #02 or step #03, the selection unit 31 determines whether or not the height position H is equal to or higher than a preset height position H2 (or is higher than the preset height position H2) that has been set in advance (step #04). If the height position H is no lower than the preset height position H2 (step #04: Yes), the selection unit 31 selects the detection information from the second sensor 22 (step #05). The height position of the second sensor 22 is lower than the height position of the first sensor 21. If the height position H is lower than the preset height position H2 (step #04: No), the processing performed by the selection unit 31 ends. The value of the preset height position H2 can be changed when necessary.

Figure 5:
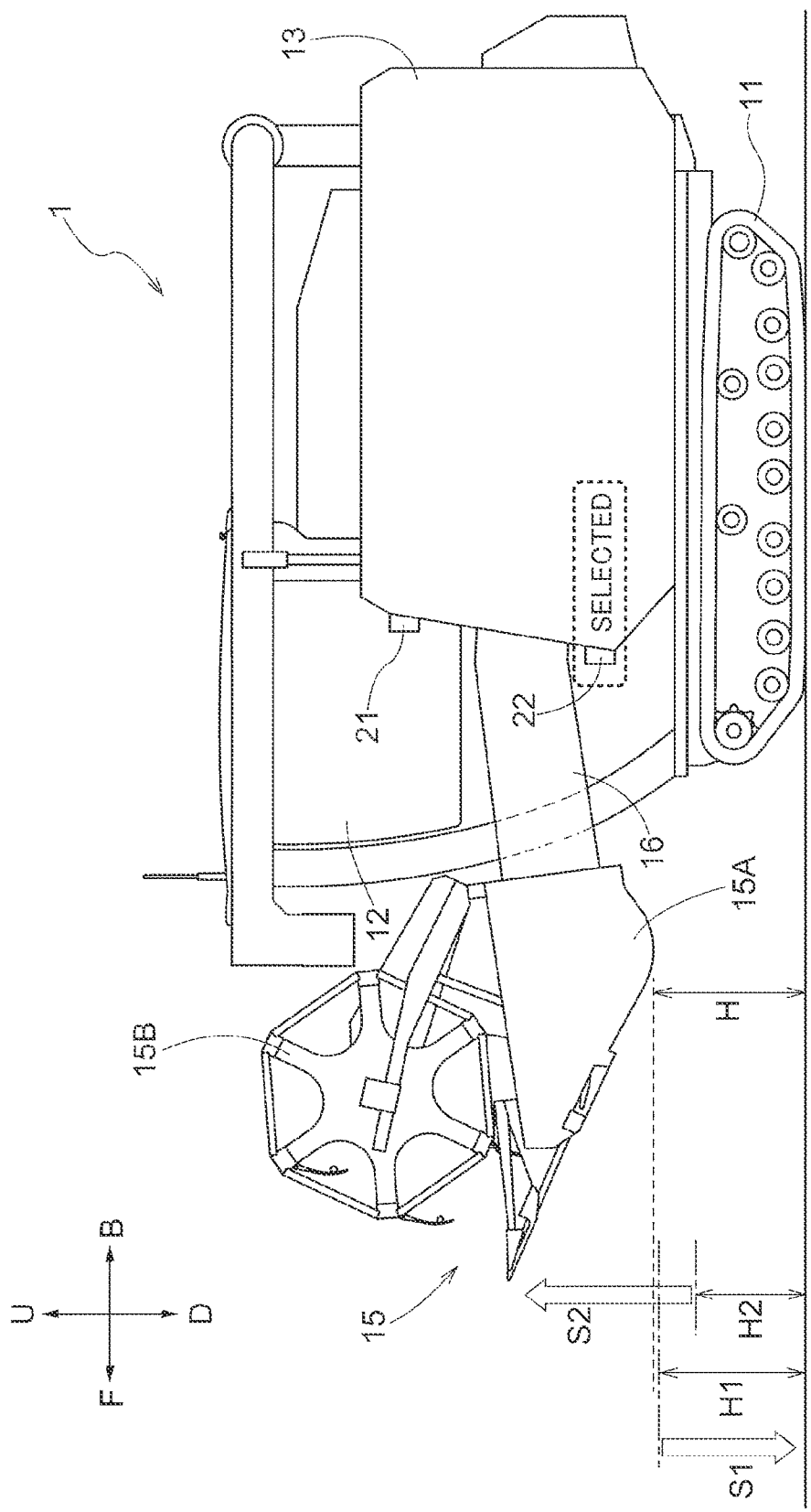
FIG. 5 is a side view showing selection between the detection information from the first sensor and the detection information from the second sensor, performed based on the height position of the harvesting unit.
Figure 6:
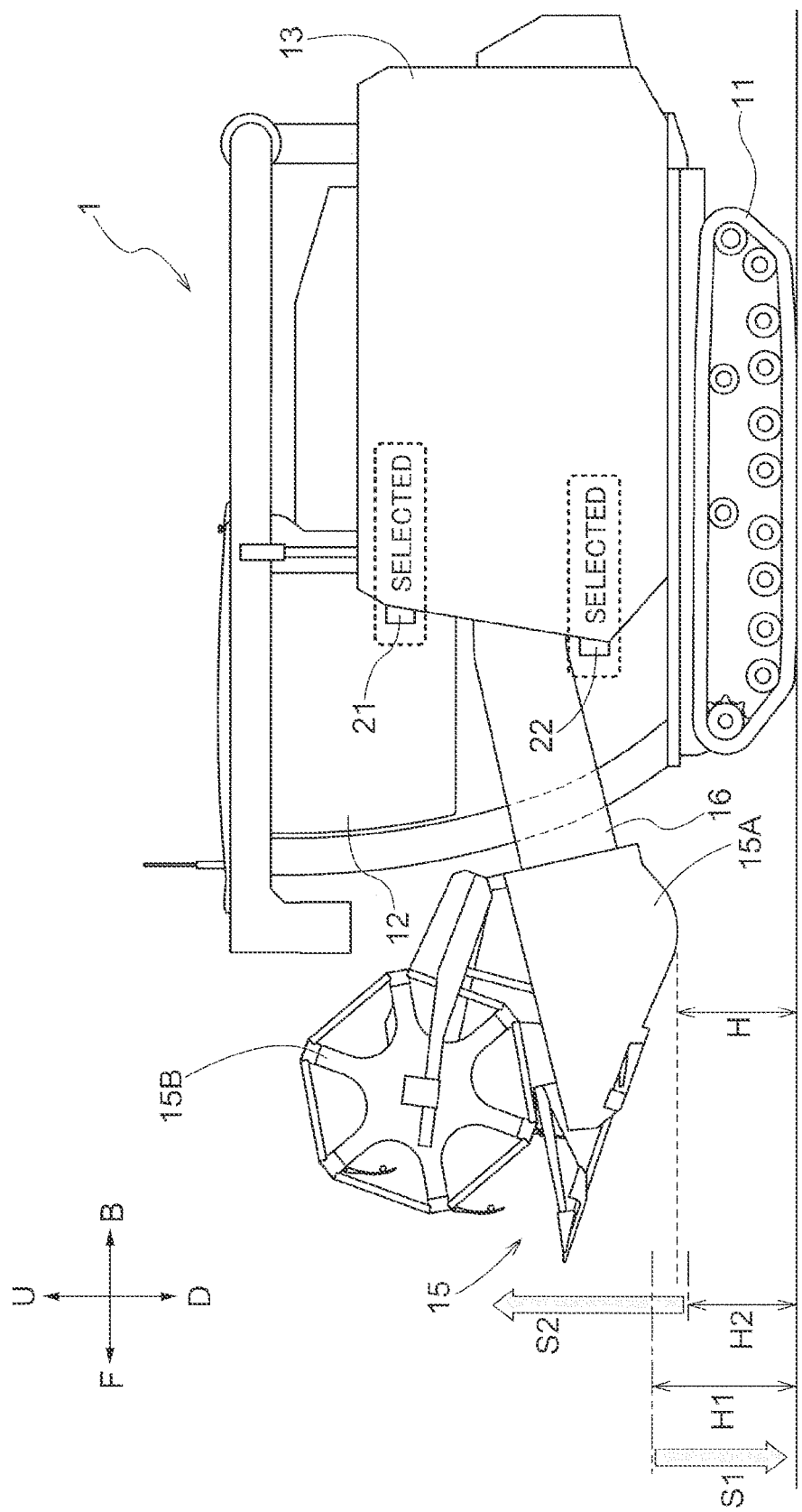
FIG. 6 is a side view showing selection between the detection information from the first sensor and the detection information from the second sensor, performed based on the height position of the harvesting unit.

FIGS. 4 to 6 show the state in which at least either the first sensor 21 or the second sensor 22 is selected based on the height position H of the harvesting unit 15. As described above, the height position H is acquired by the cutting height detection unit 23 (see FIG. 2), and the preset height positions H1 and H2 are threshold values determined in advance with respect to the height position H. The preset height positions H1 and H2 shown in FIGS. 4 to 6 are set to different values, and the preset height position H1 is set to be higher than the preset height position H2. The height position H of the harvesting unit 15 shown in FIGS. 4 to 6 is set with reference to the lower end of the harvesting unit 15. A height area S1 is indicated as an area that is no higher than the preset height position H1 (or lower than the preset height position H1) in the vertical direction. When the height position H of the harvesting unit 15 is located within the range of the height area S1, the result of the determination in step #02 shown in FIG. 3 is Yes, and the detection information from the first sensor 21 is selected by the selection unit 31 (see FIG. 2). A height area S2 is indicated as an area that is no lower than the preset height position H2 (or higher than the preset height position H2). When the height position H of the harvesting unit 15 is located within the range of the height area S2, the result of the determination in step #04 shown in FIG. 3 is Yes, and the detection information from the second sensor 22 is selected by the selection unit 31.

In FIG. 4, the height position H of the harvesting unit 15 is lower than the preset height position H1, and is lower than the preset height position H2. That is to say, the height position H of the harvesting unit 15 is located within the range of the height area S1, but is located outside the range of the height area S2. In this case, the result of the determination in step #02 shown in FIG. 3 is Yes, the result of the determination in step #04 is No, and the selection unit 31 only selects the detection information from the first sensor 21.

In FIG. 5, the height position H of the harvesting unit 15 is higher than the preset height position H1, and is higher than the preset height position H2. That is to say, the height position H of the harvesting unit 15 is located within the range of the height area S2, but is located outside the range of the height area S1. In this case, the result of the determination in step #02 shown in FIG. 3 is No, the result of the determination in step #04 is Yes, and the selection unit 31 only selects the detection information from the second sensor 22.

In FIG. 6, the height position H of the harvesting unit 15 is located between the preset height position H1 and the preset height position H2. That is to say, the height position H of the harvesting unit 15 is located within the range of the height area S1, and is also located within the range of the height area S2. In this case, the result of the determination in step #02 shown in FIG. 3 is Yes, the result of the determination in step #04 is also Yes, and the selection unit 31 selects both of the pieces of detection information respectively output from the first sensor 21 and the second sensor 22.

In this way, according to the present invention, when the determination unit 32 determines an obstacle, there are a case in which either the first sensor 21 or the second sensor 22 is used, and a case in which both the first sensor 21 and the second sensor 22 are used at the same time.

Other Embodiments Modified from First Embodiment

The following describes other embodiments modified from the above-described embodiment. The other embodiments are the same as the embodiment described above except for the matters described below. The embodiment described above and the other embodiments described below may be combined with each other as appropriate unless no contradiction arises. Note that the scope of the present invention is not limited to the embodiment described above or the other embodiments described below.

(1) In the above-described embodiment, the cutting height detection unit 23 is configured to be able to detect the height position H at which the harvesting unit 15 is located, by detecting the swing angle of the conveying apparatus 16. However, the present invention is not limited to this embodiment. As described above, the shoveling reel 15B is configured to be able to swing upward and downward relative to the harvesting header 15A. Therefore, for example, the cutting height detection unit 23 may be configured to be able to detect the swing angle of the conveying apparatus 16 and the swing angle of the shoveling reel 15B.

It is preferable that the preset height positions H1 and H2 are changed, depending on the relative positional relationship between the shoveling reel 15B and the harvesting header 15A. More specifically, as shown in FIGS. 4 to 6, when the shoveling reel 15B is closer to the harvesting header 15A in the vertical direction, visibility is improved in an area above the shoveling reel 15B. Therefore, there is the possibility of the shoveling reel 15B not hindering the sensing by the first sensor 21 even when the height position H of the harvesting unit 15 is higher than the preset height position H1. For this reason, for example, it is possible to employ a configuration in which the preset height position H1 is adjusted to be located higher as the shoveling reel 15B approaches the harvesting header 15A, so as to widen the range of the height area S1 upward. When the shoveling reel 15B is raised away from the harvesting header 15A, a visible area is secured between the harvesting header 15A and the shoveling reel 15B. Therefore, there is the possibility of the second sensor 22 being able to perform sensing from the gap between the harvesting header 15A and the shoveling reel 15B even when the height position H of the harvesting unit 15 is lower than the preset height position H2. For this reason, for example, it is possible to employ a configuration in which the preset height position H2 is adjusted to be located lower as the shoveling reel 15B is located farther from the harvesting header 15A, so as to widen the range of the height area S2 downward. As described above, it is possible to employ a configuration in which the selection unit 31 selects at least either the detection information from the first sensor 21 or the detection information from the second sensor 22 based on the height position of the harvesting header 15A and the height position of the shoveling reel 15B.

Figure 7:
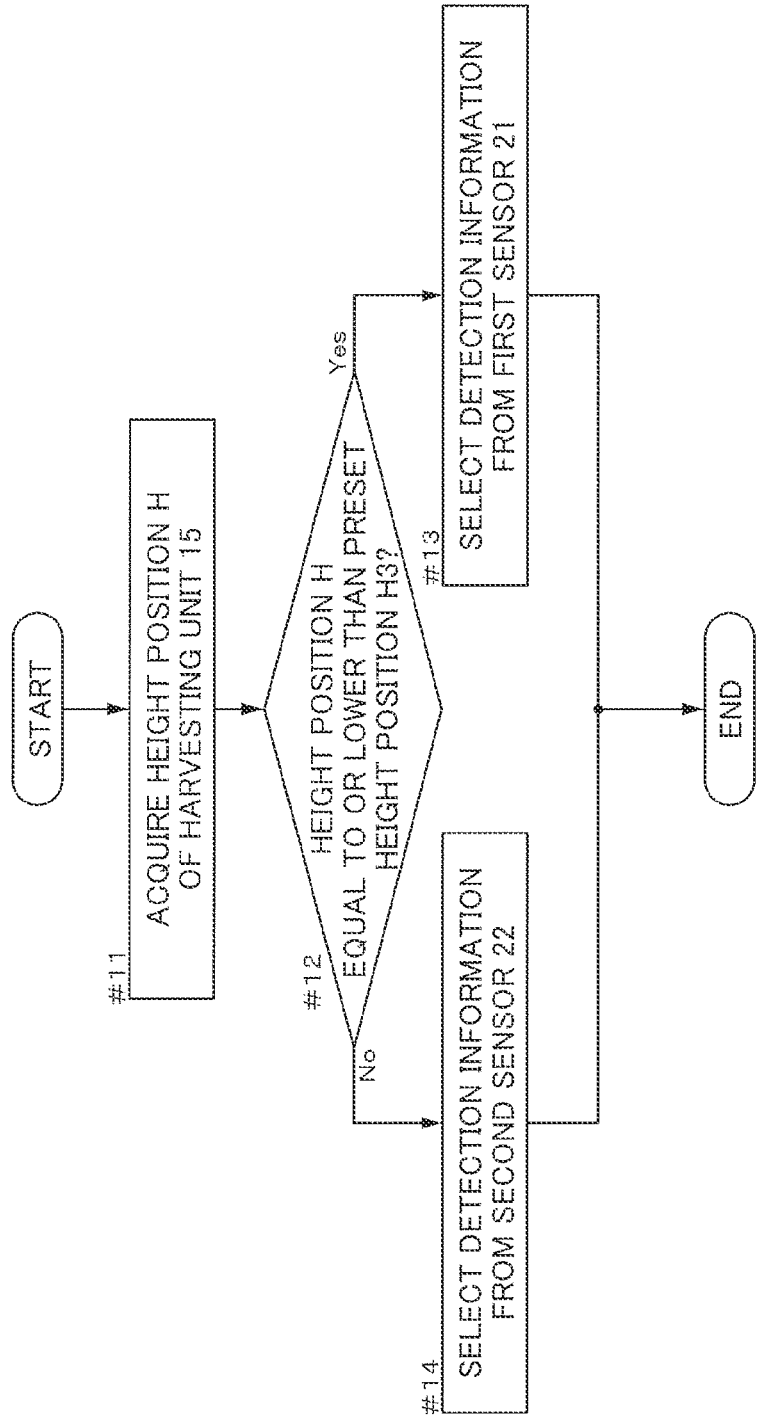
FIG. 7 is a flowchart showing another embodiment of the processing performed by the selection unit.
Figure 8:
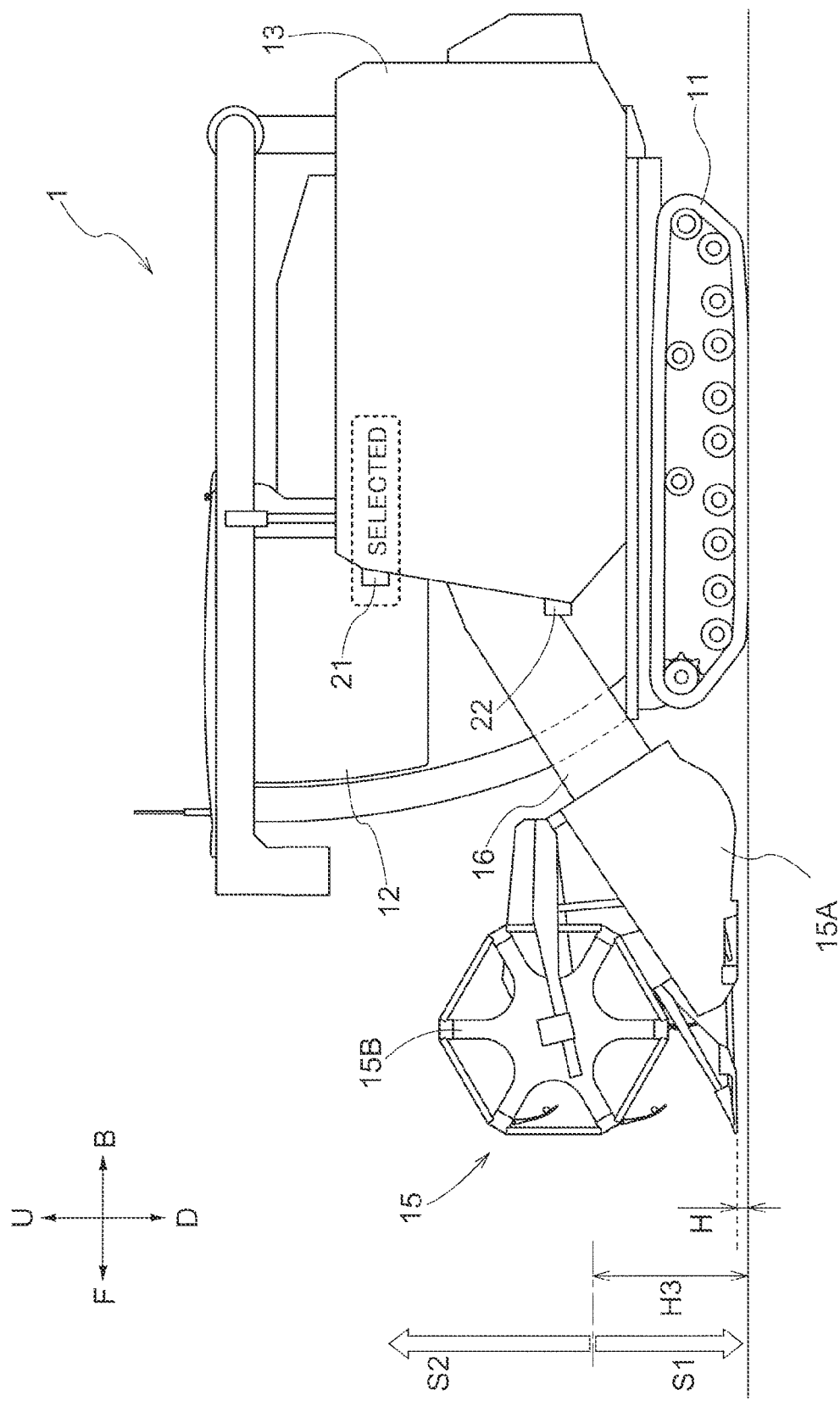
FIG. 8 is a side view showing another embodiment of selection between the detection information from the first sensor and the detection information from the second sensor, performed based on the height position of the harvesting unit.
Figure 9:
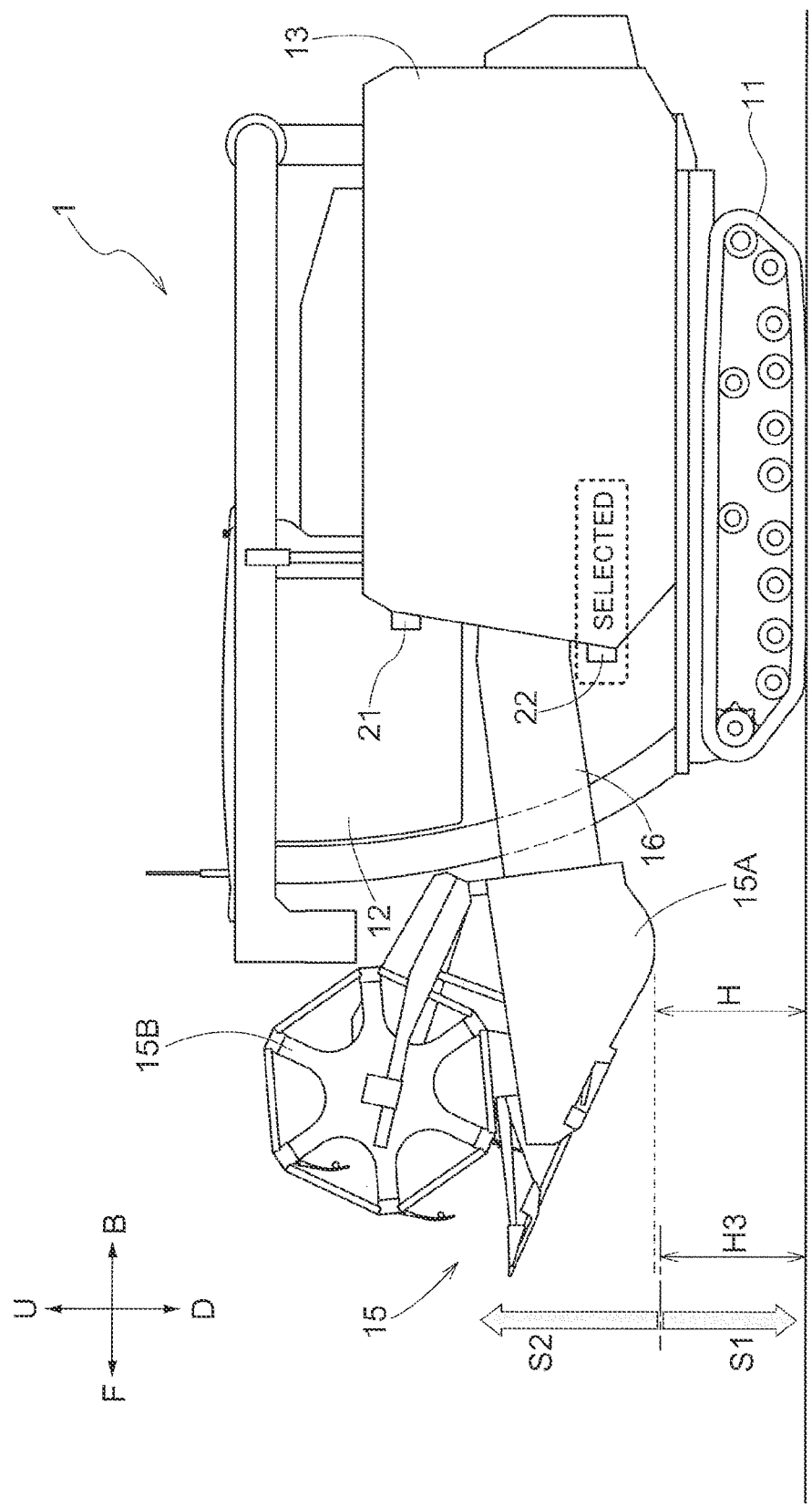
FIG. 9 is a side view showing another embodiment of selection between the detection information from the first sensor and the detection information from the second sensor, performed based on the height position of the harvesting unit.

(2) In the above-described embodiment, two preset height positions H1 and H2 that are set to different values are provided. However, as shown in FIGS. 7 to 9, for example, one of the pieces of detection information respectively output from the first sensor 21 and the second sensor 22 may be selected based on one preset height position H3. FIG. 7 shows another embodiment of the selection processing performed by the selection unit 31 to select between the detection information from the first sensor 21 and the detection information from the second sensor 22. The selection processing from the start to the end shown in FIG. 7 is performed in cycles that have a constant period. As in step #01 in FIG. 3, the selection unit 31 acquires the height position H of the harvesting unit 15 (step #11). After acquiring the height position H, the selection unit 31 determines whether or not the height position H is equal to or lower than the preset height position H3 (or is lower than the preset height position H3) that has been set in advance (step #12). If the height position H is no higher than the preset height position H3 (step #12: Yes), the selection unit 31 selects the detection information from the first sensor 21 (step #13). If the result of the determination in step #12 is No, the selection unit 31 selects the detection information from the second sensor 22 (step #14). The value of the preset height position H3 can be changed when necessary.

In the vertical direction in FIGS. 8 and 9, the height area S1 is indicated as an area that is no higher than the preset height position H3 (or lower than the preset height position H3), and the height area S2 is indicated as an area that is no lower than the preset height position H3 (or higher than the preset height position H3). In FIG. 8, the height position H of the harvesting unit 15 is lower than the preset height position H3, and is located only within the range of the height area S1. In this case, the result of the determination in step #12 shown in FIG. 7 is Yes, and the selection unit 31 only selects the detection information from the first sensor 21. In FIG. 9, the height position H of the harvesting unit 15 is higher than the preset height position H3, and is located only within the range of the height area S2. In this case, the result of the determination in step #12 shown in FIG. 7 is No, and the selection unit 31 only selects the detection information from the second sensor 22. That is to say, if the height position H of the harvesting unit 15 is no higher than the preset height position H3, the selection unit 31 selects the detection information from whichever of the first sensor 21 or the second sensor 22 that is located higher. Also, if the height position H of the harvesting unit 15 is no lower than the preset height position H3, the selection unit 31 selects the detection information from whichever of the first sensor 21 or the second sensor 22 that is located lower.

In addition, in relation to the other embodiment (1) described above, it is possible to employ a configuration in which the preset height position H3 is adjusted to be located lower as the shoveling reel 15B is located farther from the harvesting header 15A, so as to widen the range of the height area S2 downward. Also, it is possible to employ a configuration in which the preset height position H3 is adjusted to be located higher as the shoveling reel 15B approaches the harvesting header 15A, so as to widen the range of the height area S1 upward.

(3) In the above-described embodiment, the cutting height detection unit 23 is configured to be able to detect the height position H at which the harvesting unit 15 is located, by detecting the swing angle of the conveying apparatus 16. However, the present invention is not limited to this embodiment. As described above, the shoveling reel 15B is configured to be able to change the position thereof forward and rearward relative to the harvesting header 15A. Therefore, for example, the cutting height detection unit 23 may be configured to be able to detect the swing angle of the conveying apparatus 16 and the position of the shoveling reel 15B in the front-rear direction. That is to say, it is possible to employ a configuration in which the selection unit 31 selects at least either the detection information from the first sensor 21 or the detection information from the second sensor 22 based on the height position of the harvesting header 15A and the position of the shoveling reel 15B in the front-rear direction. For example, it is conceivable that the proportion of the detection area that is occupied by the shoveling reel 15B, of the detection area of the first sensor 21 and the detection area of the second sensor 22, decreases as the shoveling reel 15B is located further forward. For this reason, it is possible to employ a configuration in which the preset height position H1 shown in FIGS. 4 to 6 is adjusted in the vertical direction according to the position of the shoveling reel 15B in the front-rear direction. For example, it is possible to employ a configuration in which the preset height position H1 is adjusted to be located higher as the shoveling reel 15B is located further forward, so as to widen the range of the height area S1 upward. Also, it is possible to employ a configuration in which the preset height position H2 shown in FIGS. 4 to 6 is adjusted in the vertical direction according to the position of the shoveling reel 15B in the front-rear direction. For example, it is possible to employ a configuration in which the preset height position H2 is adjusted to be located lower as the shoveling reel 15B is located further forward, so as to widen the range of the height area S2 downward.

Figure 10:
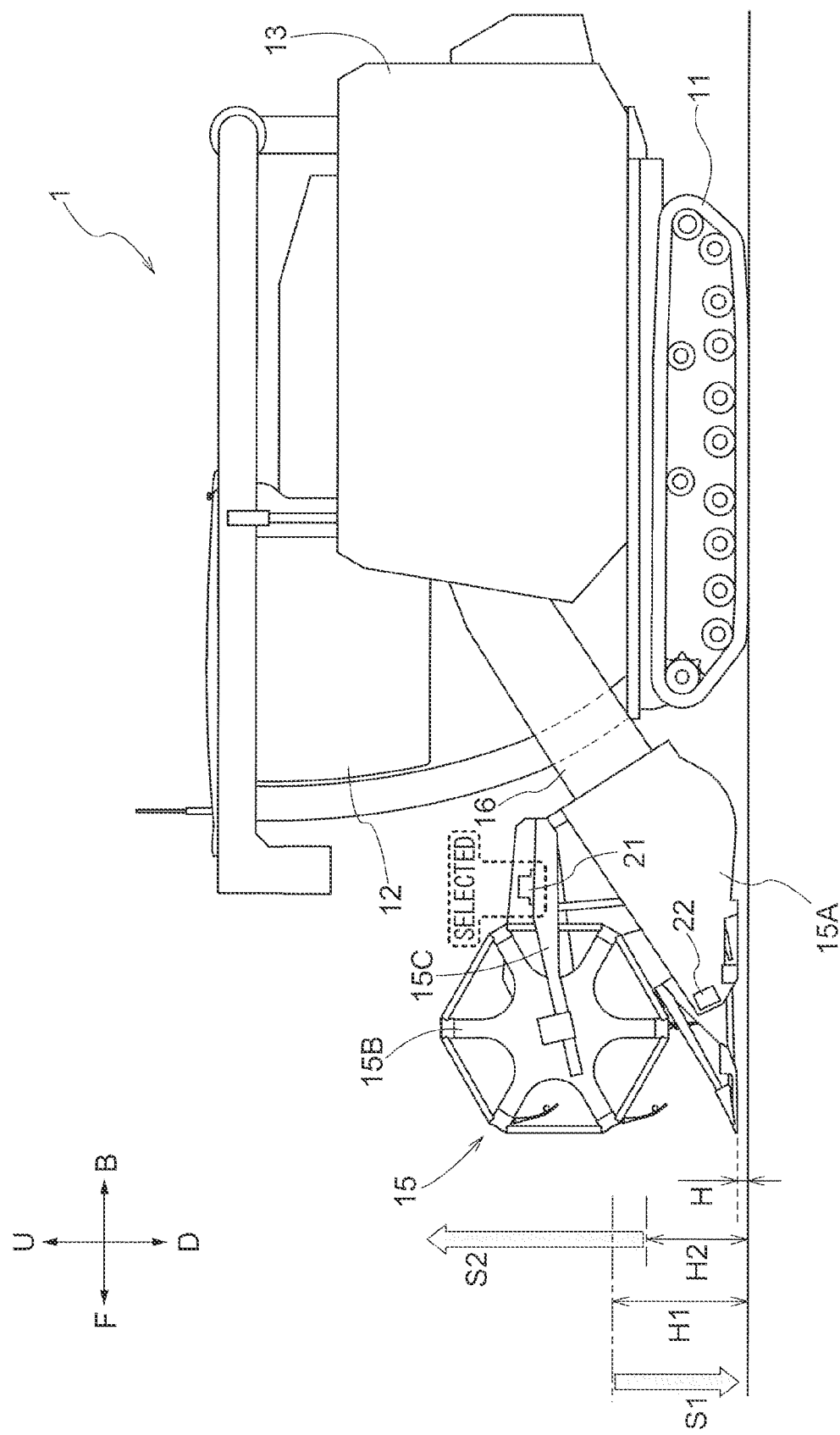
FIG. 10 is a side view showing a state in which the first sensor and the second sensor are provided on the harvesting unit according to another embodiment.

(4) The first sensor 21 and the second sensor 22 may be provided on the harvesting unit 15. For example, as shown in FIG. 10, it is possible to employ a configuration in which second sensors 22 are respectively provided in the areas of a pair of left and right dividers of the harvesting unit 15, and first sensors 21 are respectively provided at positions that are rearward of the shoveling reel 15B and are on the right side and the left side of the shoveling reel 15B. As shown in FIG. 10, swingable members 15C are provided on left and right end portions of the harvesting header 15A so as to be able to swing upward and downward, and the shoveling reel 15B is supported at free end portions of the swingable members 15C. It is also possible to employ a configuration in which the first sensors 21 are respectively provided on swing base end portions of the left and right swingable members 15C. In addition, it is possible to employ a configuration in which the selection unit 31 selects the first sensors 21 when the height position H of the harvesting unit 15 is lower than the preset height position H1. If harvesting work is performed in a state where the harvesting unit 15 has been lowered, it is difficult for the second sensors 22 to detect an obstacle that is located forward thereof because the second sensors 22 are located near the bases of the crops in the cultivated land. However, with the above configuration, it is easier for the first sensors 21 than the second sensors 22 to detect an obstacle that is located forward thereof, from positions higher than the second sensors 22. Also, it is possible to employ a configuration in which the selection unit 31 selects the second sensors 22 when the height position H of the harvesting unit 15 is higher than the preset height position H2. In a state where the harvesting unit 15 has been raised, it may be difficult for the first sensors 21 to detect an obstacle that is located forward thereof because the first sensors 21 are located too high from the ground. However, with the above configuration, it is easier for the second sensors 22 than the first sensors 21 to detect an obstacle that is located forward thereof, from positions lower than the first sensors 21.

In the example shown in FIG. 10, when the harvesting unit 15 swings upward, the first sensors 21 are inclined upward, and it is conceivable that the sensing direction of the first sensors 21 is an upward direction relative to the forward direction in the travel direction. Therefore, for example, it is possible to employ a configuration in which, when the height position H of the harvesting unit 15 is higher than the preset height position H1, the sensing direction of the first sensors 21 is adjusted downward. Also, it is possible to employ a configuration in which, when the height position H of the harvesting unit 15 is lower than the preset height position H2, the sensing direction of the second sensors 22 is adjusted upward. That is to say, at least the first sensors 21 or the second sensors 22 may be configured to be able to change the sensing direction thereof according to the height position H of the harvesting unit 15.

(5) In the above-described embodiment, the first sensor 21 and the second sensor 22 are provided on the left end portion of the front wall of the threshing apparatus 13. However, the present invention is not limited to this embodiment. For example, the first sensor 21 and the second sensor 22 may be provided on a front right end portion of the boarding section 12. In this case, the height positions of the first sensor 21 and the second sensor 22 on the front right end portion of the boarding section 12 may be the same or substantially the same as the height of the first sensor 21 and the second sensor 22 on the front wall of the threshing apparatus 13. Also, a pair of first sensors 21 and a pair of second sensors 22 may respectively be provided on the front wall of the threshing apparatus 13 and the front right end portion of the boarding section 12. In addition, the first sensors 21 and the second sensors 22 may be provided at a central position in the left-right direction on a front right end portion of the machine main body 1 (for example, the front left end corner of the boarding section 12).

(6) In the above-described embodiment, the first sensor 21 and the second sensor 22 are sonars. However, the present invention is not limited to this embodiment. For example, the first sensor 21 and the second sensor 22 may be imaging devices (for example, CCD cameras, CMOS cameras, or infrared cameras). When the first sensor 21 and the second sensor 22 are imaging devices, the detection targets indicated by signs Z0. Z1, Z2, Z3, and Z4 in FIG. 1 can be precisely identified. Alternatively, the first sensor 21 and the second sensor 22 may be radars (millimeter-wave radars) or LIDAR (for example, laser scanners or laser radars). If the first sensor 21 and the second sensor 22 are millimeter-wave radars, it is possible to perform detection that is less likely to be affected by the weather. If the millimeter-wave radars are configured to be able to perform scanning in three dimensions, namely in the vertical direction in addition to the forward direction and the left-right direction, it is possible to have a wider detection range than the millimeter-wave radars that perform scanning in two dimensions. If the first sensor 21 and the second sensor 22 are LIDARs, it is possible to accurately measure the separation distance to the detection target. In addition, if the LIDARs are configured to be able to perform scanning in three dimensions, namely in the vertical direction in addition to the forward direction and the left-right direction, it is possible to have a wider detection range than LIDARs that perform scanning in two dimensions. Also, the first sensor 21 and the second sensor 22 may be constituted by a combination of different sensors.

For example, the first sensor 21 or the second sensor 22 is an imaging device, detection information output from the imaging device is captured image data. If the first sensor 21 or the second sensor 22 is a sonar, a millimeter-wave radar, or a LIDAR, detection information output from the sonar, the millimeter-wave radar, or the LIDAR is distance measuring information.

(7) In the above-described embodiment, the cutting height detection unit 23 is configured to be able to detect the height position H, which is height position information regarding the harvesting unit 15, by detecting the swing angle of the conveying apparatus 16. The selection unit 31 is configured to select at least either the detection information from the first sensor 21 or the detection information from the second sensor 22 based on the height position H of the harvesting unit 15. However, the present invention is not limited to this embodiment. For example, the cutting height detection unit 23 may be configured to detect the swing angle of the conveying apparatus 16, and the selection unit 31 may be configured to select at least either the detection information from the first sensor 21 or the detection information from the second sensor 22 based on the swing angle of the conveying apparatus 16. That is to say, the "height position" of the harvesting unit 15 is not limited to the height position H, and may be the swing angle of the conveying apparatus 16. In addition, although the height position H of the harvesting unit 15 shown in FIGS. 4 to 6 and 8 to 10 is set with reference to the lower end of the harvesting unit 15, it may be set with reference to a position of the cutting blade (not shown) of the harvesting unit 15, for example.

(8) The present invention may be embodied as a control program that enables a computer to realize the functions of the members in the above-described embodiment. Alternatively, the present invention may be embodied as a recording medium having recorded thereon a control program that enables a computer to realize the functions of the members in the above-described embodiment. Alternatively, the present embodiment may be embodied as a control method for carrying out the operations performed by the members in the above-described embodiment, through one or more steps.

Second Embodiment

Figure 11:
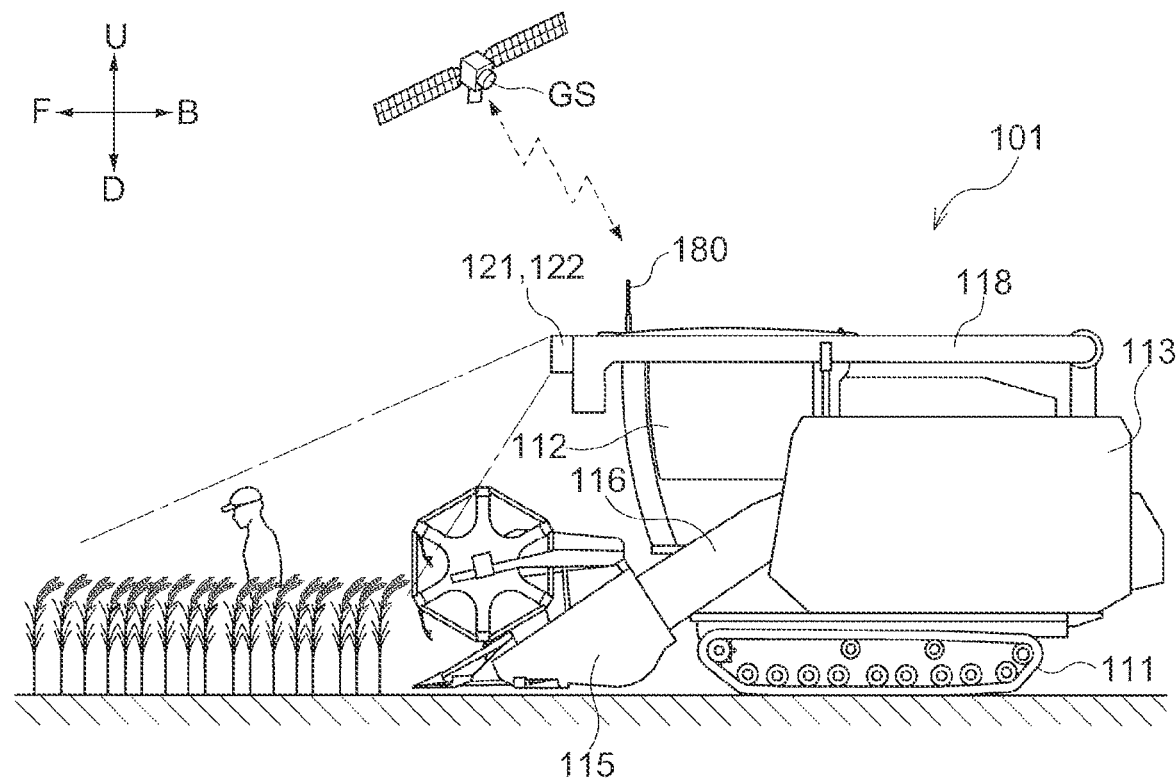
FIG. 11 is a diagram showing a second embodiment (the same applies up to FIG. 15), and is a left side view of a combine.
Figure 12:
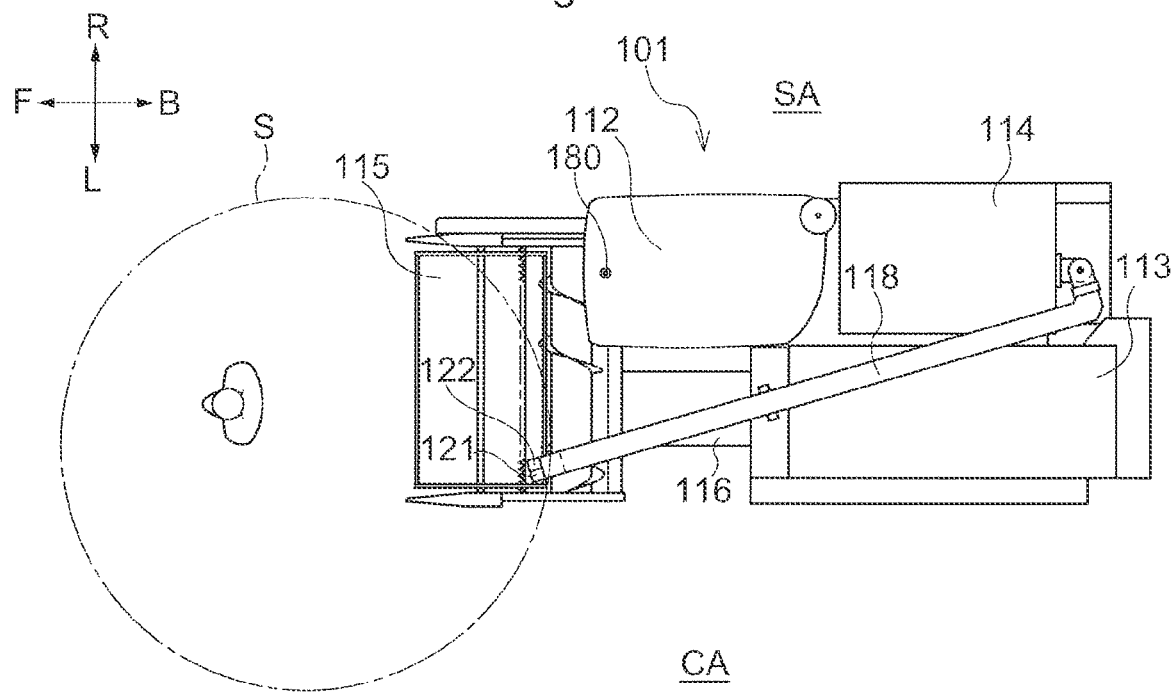
FIG. 12 is a plan view showing a configuration of the combine and a visual field area.

The following describes a second embodiment of the present invention with reference to FIGS. 11 to 15. In the following description, the direction indicated by the arrow F shown in FIGS. 11 and 12 is a "forward" direction, and the direction indicated by the arrow B is a "rearward" direction unless otherwise indicated. The direction indicated by the arrow L in FIG. 12 is a direction to the "left", and the direction indicated by the arrow R is a direction to the "right". The direction indicated by the arrow U in FIG. 11 is an "upward" direction, and the direction indicated by the arrow D is a "downward" direction.

Overall Configuration of Combine

As shown in FIGS. 11 and 12, a normal-type combine 101 (corresponding to the "agricultural work machine" according to the present invention) includes crawler-type travel apparatuses 111 (corresponding to the "predetermined apparatus" according to the present invention), a driver section 112, a threshing apparatus 113, a grain tank 114, a harvesting unit 115, a conveying apparatus 116, a grain discharge apparatus 118, and a satellite positioning module 180.

The travel apparatuses 111 are provided on a lower portion of the combine 101. The travel apparatuses 111 are drive by power transmitted from an engine (not shown). The combine 101 is self-propelled using the travel apparatuses 111.

The driver section 112, the threshing apparatus 113, and the grain tank 114 are provided at higher positions than the travel apparatuses 111. An operator who monitors the combine 101's work can board the driver section 112. Note that an operator may monitor the combine 101's work from the outside of the combine 101.

The grain discharge apparatus 118 is provided at a higher position than the threshing apparatus 113 and the grain tank 114. The satellite positioning module 180 is attached to the upper surface of the driver section 112.

The harvesting unit 115 is provided on a front portion of the combine 101. The conveying apparatus 116 is provided so as to span between a rear end portion of the harvesting unit 115 and a front end portion of the threshing apparatus 113.

The harvesting unit 115 shovels the planted stalks to be harvested, and cuts the planted stalks in the cultivated land.

Thus, the harvesting unit 115 harvests crops in the cultivated land. The combine 101 can perform reaping travel through which the combine 101 travels using the travel apparatuses 111 while reaping the planted stalks in the cultivated land using the harvesting unit 115.

The reaped stalks reaped by the harvesting unit 115 are conveyed by the conveying apparatus 116 to the threshing apparatus 113. In the threshing apparatus 113, the reaped stalks are subjected to threshing processing. The grains obtained through threshing processing are stored in the grain tank 114. The grains stored in the grain tank 114 are discharged to the outside of the machine by the grain discharge apparatus 118 when necessary.

Configuration Related to Automatic Travel

Figure 13:
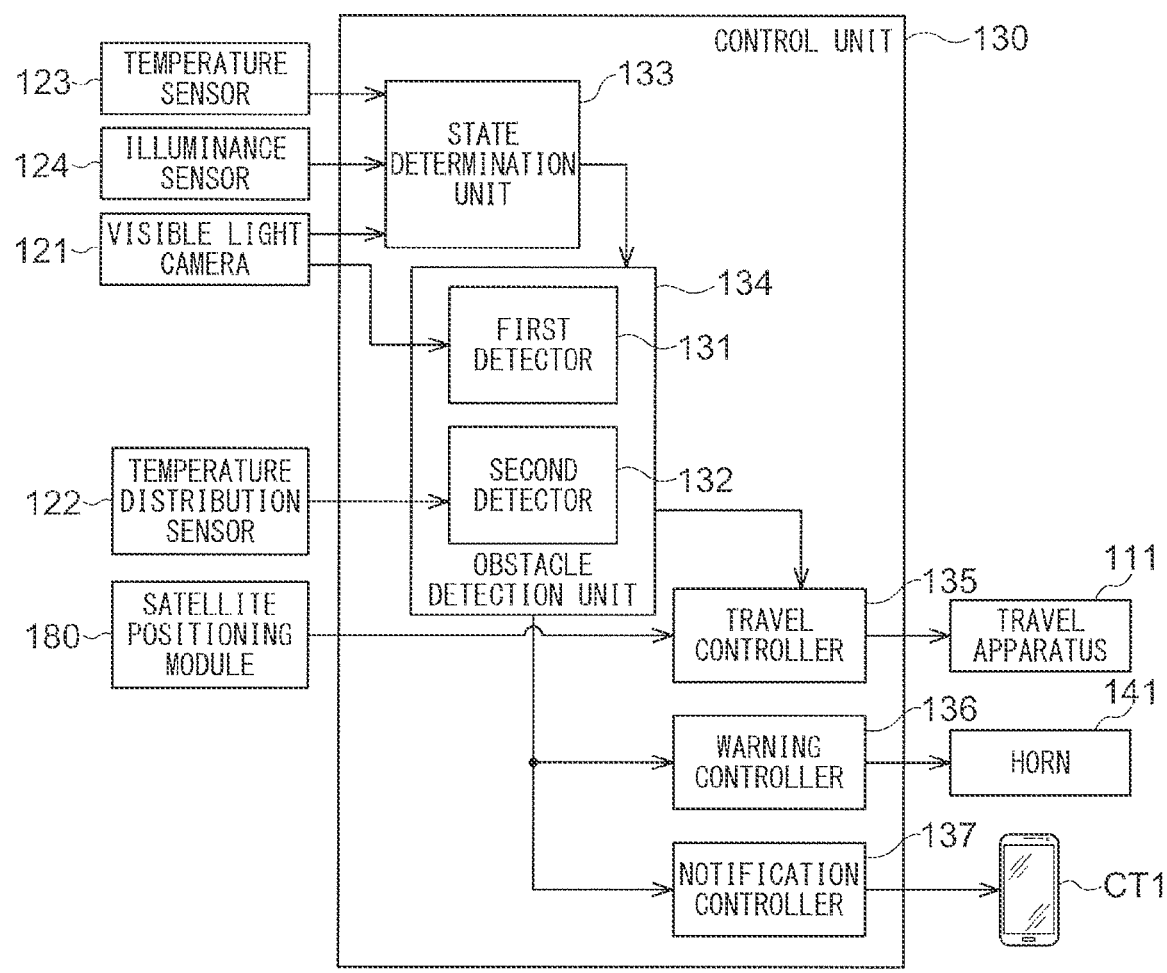
FIG. 13 is a block diagram showing a configuration related to a control unit.

As shown in FIG. 13, the combine 101 includes a control unit 130. The control unit 130 is an assembly of a plurality of ECUs. The control unit 130 includes a travel controller 135 (corresponding to the "apparatus control unit" according to the present invention).

Also, as shown in FIG. 11, the satellite positioning module 180 receives GPS signals from an artificial satellite GS that is used in a GPS (Global Positioning System). As shown in FIG. 13, the satellite positioning module 180 transmits positioning data that indicates the position of the combine 101 itself, to the travel controller 135, based on the received GPS signals.

The travel controller 135 calculates the position coordinates of the combine 101 over time based on the positioning data output from the satellite positioning module 180. The travel controller 135 performs automatic travel based on the calculated position coordinates of the combine 101 over time and a preset travel path.

More specifically, the travel controller 135 controls the travel apparatuses 111 so as to perform reaping travel through automatic travel along the travel path.

Thus, the combine 101 can perform automatic travel.

Note that various operation members (not shown) are provided on the driver section 112. When an operator is on the driver section 112, the operator can control the travel of the combine 101, using these operation members. That is to say, the combine 101 realizes manual travel in addition to automatic travel.

Configuration Related to Obstacle Detection

As shown in FIGS. 11 and 12, the combine 101 includes a visible light camera 121 (corresponding to the "imaging device" according to the present invention) and a temperature distribution sensor 122 (corresponding to the "detection device" according to the present invention).

The visible light camera 121 can acquire a captured image of visible light by detecting visible light. The temperature distribution sensor 122 detects a temperature distribution in the field of view. That is to say, the temperature distribution sensor 122 is a sensor of a type different from the visible light camera 121.

The visible light camera 121 and the temperature distribution sensor 122 are attached to the front end of the grain discharge apparatus 118 so as to be adjacent to each other. The visible light camera 121 and the temperature distribution sensor 122 both face toward the cultivated land.

The fields of view of the visible light camera 121 and the temperature distribution sensor 122 in a plan view both coincide with a visual field area S shown in FIG. 12. The visual field area S is a circular area centered around the front left position of an uncut area CA in the cultivated land, located on the left and forward of the combine 101.

Note that the present invention is not limited in such a way, and the visual field area S may have any shape other than the circular shape.

FIG. 12 shows a cut area SA. The cut area SA is located on the right side of the combine 101. The uncut area CA is located forward and on the left side of the combine 101.

As shown in FIG. 13, the control unit 130 includes an obstacle detection unit 134. The obstacle detection unit 134 includes a first detector 131 and a second detector 132.

As shown in FIG. 13, the image captured by the visible light camera 121 is transmitted to the first detector 131. The first detector 131 detects an obstacle around the machine body based on the image captured by the visible light camera 121. In this case, the first detector 131 detects an obstacle around the machine body, using a neural network learned through deep learning.

Figure 14:
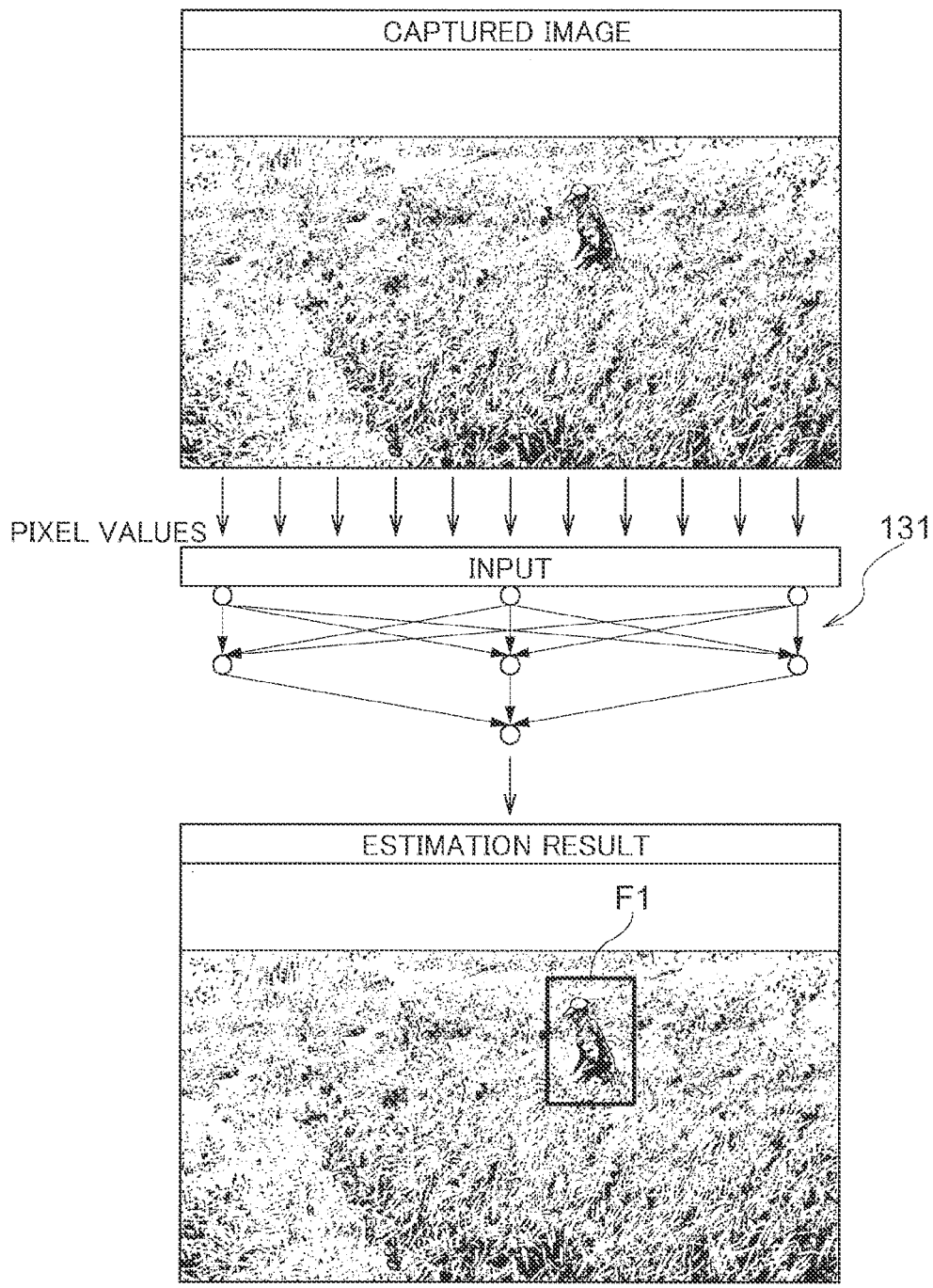
FIG. 14 is a diagram showing a flow of obstacle detection that is performed by a first detector.

FIG. 14 shows a flow of obstacle detection that is performed by the first detector 131. The following describes the obstacle detection performed by the first detector 131, assuming that the target to be detected by the first detector 131 is a person.

As shown in FIG. 14, the pixel values of the pixels included in the image captured by the visible light camera 121 are input to the first detector 131. The first detector 131 outputs data that indicates an estimation result (detection result). This data includes the area of existence of the person and the estimated probability thereof.

The estimation result in FIG. 14 indicates a person area F1, which is the area of existence of the person, as a rectangular frame. The estimation probability is linked with the person area F1. The person area F1 is defined by four corner points. The coordinate positions of these four corner points in the captured image are also included in the estimation result. If the detection target is not estimated in the captured image, the person area F1 is not output and the estimation probability is zero.

With the configuration described above, the first detector 131 detects an obstacle that is located in the visual field area S.

Also, as shown in FIG. 13, the result of the detection by the temperature distribution sensor 122 is transmitted to the second detector 132. The second detector 132 detects an obstacle around the machine body based on the result of the detection by the temperature distribution sensor 122. In this case, the second detector 132 detects an obstacle around the machine body, using a neural network learned through deep learning.

Figure 15:
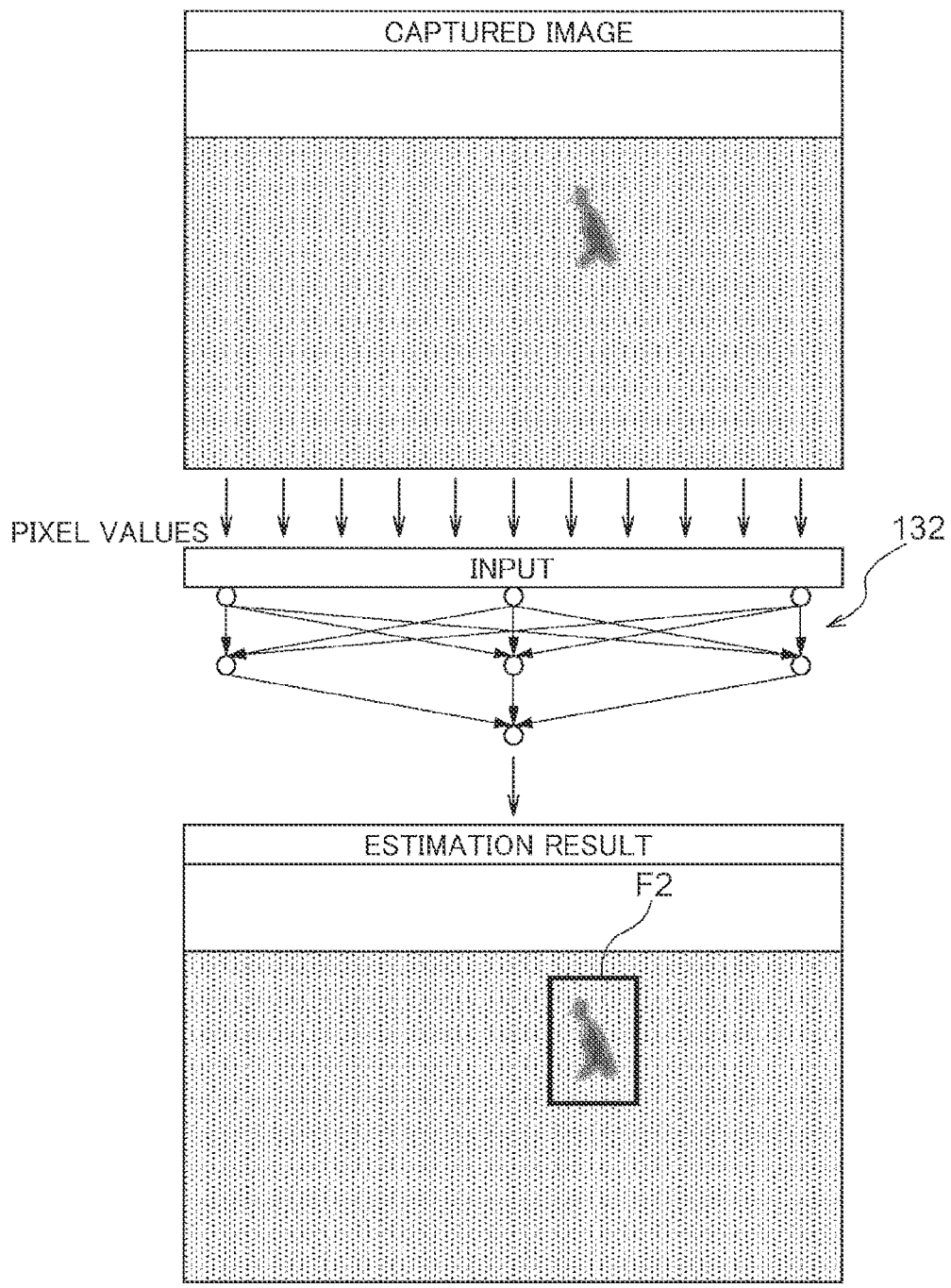
FIG. 15 is a diagram showing a flow of obstacle detection that is performed by a second detector.

FIG. 15 shows a flow of obstacle detection that is performed by the second detector 132. The following describes the obstacle detection performed by the second detector 132, assuming that the target to be detected by the second detector 132 is a person.

As shown in FIG. 15, the result of the detection by the temperature distribution sensor 122 is input to the second detector 132 as a captured image that shows the temperature distribution. At this time, the pixel values of the pixels include in the captured image showing the temperature distribution are input to the second detector 132. The second detector 132 outputs data that indicates an estimation result (detection result). This data includes the area of existence of the person and the estimated probability thereof.

The estimation result in FIG. 15 indicates a person area F2, which is the area of existence of the person, as a rectangular frame. The estimation probability is linked with the person area F2. The person area F2 is defined by four corner points. The coordinate positions of these four corner points in the captured image are also included in the estimation result. If the detection target is not estimated in the captured image, the person area F2 is not output and the estimation probability is zero.

With the configuration described above, the second detector 132 detects an obstacle that is located in the visual field area S.

If an obstacle is not detected by the first detector 131 and an obstacle is not detected by the second detector 132, the obstacle detection unit 134 does not output a signal indicating that an obstacle is detected.

If an obstacle is detected by only one of the first detector 131 and the second detector 132, the obstacle detection unit 134 outputs a signal indicating that an obstacle is detected.

If an obstacle is detected by both of the first detector 131 and the second detector 132, the obstacle detection unit 134 outputs a signal indicating that an obstacle is detected.

With the configuration described above, the obstacle detection unit 134 is capable of detecting an obstacle around the machine body based on the image captured by the visible light camera 121 and the result of the detection by the temperature distribution sensor 122.

Control Performed when Obstacle is Detected

As shown in FIG. 13, the combine 101 includes a horn 141 (corresponding to the "predetermined apparatus" according to the present invention). The control unit 130 includes a warning controller 136 (corresponding to the "apparatus control unit" according to the present invention) and a notification controller 137 (corresponding to the "apparatus control unit" according to the present invention).

The signal indicating that an obstacle is detected is transmitted from the obstacle detection unit 134 to the travel controller 135, the warning controller 136, and the notification controller 137. In the following description, the signal indicating that an obstacle is detected is referred to as a detection signal, and control that is performed by the travel controller 135, the warning controller 136, and the notification controller 137 is described.

Upon receiving a detection signal, the travel controller 135 executes at-detection stop control (corresponding to the "at-detection control" according to the present invention). At-detection stop control is control that is performed upon an obstacle being detected.

Specifically, at-detection stop control is control that is performed to stop the driving of the travel apparatuses 111. Therefore, upon the at-detection stop control being executed, the combine 101 stops travelling.

Thus, if the obstacle detection unit 134 detects an obstacle, the travel controller 135 performs at-detection stop control that is control to be performed upon an obstacle being detected.

In addition, the warning controller 136 controls the horn 141 (corresponding to the "predetermined apparatus" according to the present invention). Upon receiving a detection signal, the warning controller 136 executes at-detection warning control (corresponding to the "at-detection control" according to the present invention). At-detection warning control is control that is performed upon an obstacle being detected.

Specifically, at-detection warning control is control that is performed to emit warning sound from the horn 141. Therefore, upon at-detection warning control being executed, the horn 141 emits warning sound.

As a result, if the detected obstacle is a person or a bird or beast, a warning can be given to the obstacle.

Thus, if the obstacle detection unit 134 detects an obstacle, the warning controller 136 performs at-detection warning control that is the control to be performed upon an obstacle being detected.

In addition, the notification controller 137 controls a mobile communication terminal CT1 (corresponding to the "predetermined apparatus" according to the present invention). Note that the mobile communication terminal CT1 is located outside the combine 101. Upon receiving a detection signal, the notification controller 137 executes at-detection notification control (corresponding to the "at-detection control" according to the present invention). At-detection notification control is control that is performed upon an obstacle being detected.

Specifically, at-detection notification control is control that is performed to display a notification screen on the mobile communication terminal CT1. Therefore, upon at-detection notification control being executed, a notification screen is displayed on the mobile communication terminal CT1. Note that this notification screen includes a notification message indicating that an obstacle is detected.

As a result, the owner of the mobile communication terminal CT1 is notified of the fact that an obstacle is detected. Note that, for example, the owner of the mobile communication terminal CT1 may be an operator monitoring the combine 101's work from the outside of the combine 101.

Thus, if the obstacle detection unit 134 detects an obstacle, the notification controller 137 performs at-detection notification control that is the control to be performed upon an obstacle being detected.

Configuration Related to State Determination Unit

As shown in FIG. 13, the combine 101 includes a temperature sensor 123 and an illuminance sensor 124. Also, the control unit 130 includes a state determination unit 133.

The temperature sensor 123 detects the temperature near the visible light camera 121. The illuminance sensor 124 detects the illuminance outside the combine 101.

The state determination unit 133 determines whether or not the image capturing state of the visible light camera 121 is normal. The following describes a configuration related to the state determination unit 133.

As shown in FIG. 13, the image captured by the visible light camera 121 is transmitted to the state determination unit 133. The state determination unit 133 is configured to be able to determine whether or not the image capturing state of the visible light camera 121 is normal, based on the image captured by the visible light camera 121.

More specifically, the visible light camera 121 acquires a captured image at predetermined time intervals. The state determination unit 133 compares the captured images with each other to detect a region in which the pixel values are substantially unchanged even though a time has elapsed. In the following description, this region is referred to as an unchanged region.

If the unchanged region in the captured image has an area no less than a predetermined area, the state determination unit 133 determines that the image capturing state of the visible light camera 121 is not normal.

For example, if a relatively large amount of dirt is attached to the visible light camera 121, an unchanged region that has an area no less than the predetermined area will be detected. As a result, the state determination unit 133 determines that the image capturing state of the visible light camera 121 is not normal.

Also, as described above, the temperature sensor 123 detects the temperature near the visible light camera 121. As shown in FIG. 13, the result of the detection by the temperature sensor 123 is transmitted to the state determination unit 133.

Here, if the temperature near the visible light camera 121 is relatively high, the image captured by the visible light camera 121 is likely to contain a large amount of noise. Therefore, the temperature near the visible light camera 121 is a value indicating the image capturing state of the visible light camera 121.

The state determination unit 133 is configured to be able to determine whether or not the image capturing state of the visible light camera 121 is normal, based on the result of the detection by the temperature sensor 123. If the result of the detection by the temperature sensor 123 indicates a temperature no less than a predetermined temperature, the state determination unit 133 determines that the image capturing state of the visible light camera 121 is not normal.

Also, as described above, the illuminance sensor 124 detects the illuminance outside the combine 101. As shown in FIG. 13, the result of the detection by the illuminance sensor 124 is transmitted to the state determination unit 133.

Here, if the illuminance outside the combine 101 is relatively high or relatively low, the image captured by the visible light camera 121 is likely to be unclear. Therefore, the illuminance outside the combine 101 is a value indicating the image capturing state of the visible light camera 121.

The state determination unit 133 is configured to be able to determine whether or not the image capturing state of the visible light camera 121 is normal, based on the result of the detection by the illuminance sensor 124. If the result of the detection by the illuminance sensor 124 indicates an illuminance higher than a predetermined upper limit illuminance, the state determination unit 133 determines that the image capturing state of the visible light camera 121 is not normal. If the result of the detection by the illuminance sensor 124 indicates an illuminance lower than a predetermined lower limit illuminance, the state determination unit 133 determines that the image capturing state of the visible light camera 121 is not normal.

If the image capturing state of the visible light camera 121 is not determined as abnormal in the above-described determinations based on the image captured by the visible light camera 121, the result of the detection by the temperature sensor 123, and the result of the detection by the illuminance sensor 124, the state determination unit 133 determines that the image capturing state of the visible light camera 121 is normal.

Note that the present invention is not limited to the above-described configurations. For example, the state determination unit 133 may be configured to determine whether or not the image capturing state of the visible light camera 121 is normal, based on one or two of: the image captured by the visible light camera 121; the result of the detection by the temperature sensor 123; and the result of the detection by the illuminance sensor 124.

In this way, the state determination unit 133 determines whether or not the image capturing state of the visible light camera 121 is normal, based on at least the value indicating the image capturing state of the visible light camera 121 or the image captured by the visible light camera 121.

As shown in FIG. 13, the result of the determination by the state determination unit 133 is transmitted to the obstacle detection unit 134.

During a period in which the state determination unit 133 determines that the image capturing state of the visible light camera 121 is normal, the obstacle detection unit 134 performs obstacle detection using the first detector 131 and the second detector 132.

If the state determination unit 133 determines that the image capturing state of the visible light camera 121 is not normal, the obstacle detection unit 134 stops the obstacle detection by the first detector 131. In this case, the obstacle detection unit 134 performs obstacle detection only using the second detector 132, of the first detector 131 and the second detector 132.

That is to say, in this case, the obstacle detection unit 134 detects an obstacle around the machine body based only on the result of the detection by the temperature distribution sensor 122, of the image captured by the visible light camera 121 and the result of the detection by the temperature distribution sensor 122.

In this way, if the state determination unit 133 determines that the image capturing state of the visible light camera 121 is not normal, the obstacle detection unit 134 detects an obstacle around the machine body based on the result of the detection by the temperature distribution sensor 122.

With the configuration described above, the obstacle detection unit 134 is capable of detecting an obstacle around the machine body based only on the result of the detection by the temperature distribution sensor 122, of the image captured by the visible light camera 121 and the result of the detection by the temperature distribution sensor 122. Also, as described above, the obstacle detection unit 134 is capable of detecting an obstacle around the machine body based on the image captured by the visible light camera 121 and the result of the detection by the temperature distribution sensor 122.

That is to say, the obstacle detection unit 134 is configured to detect an obstacle around the machine body based on at least either the image captured by the visible light camera 121 or the result of the detection by the temperature distribution sensor 122.

With the configuration described above, in a situation where accuracy in obstacle detection that is based only on the image captured by the visible light camera 121 is likely to be low, such as when the image captured by the visible light camera 121 is unclear, for example, it is possible to detect an obstacle around the machine body based on the result of the detection by the temperature distribution sensor 122.

Therefore, with the configuration described above, it is possible to realize a combine 101 with which accuracy in obstacle detection is less likely to be low when accuracy in obstacle detection that is based only on a captured image is likely to be low.

That is to say, with the configuration described above, it is possible to realize a combine 101 with a desirable obstacle detection accuracy.

In addition, with the configuration described above, it is possible to realize a combine 101 that performs appropriate control when an obstacle is detected.

Note that the embodiment described above is merely an example. The present invention is not limited to the embodiment, and may be modified as appropriate.

Other Embodiments Modified from Second Embodiment

The following describes other embodiments modified from the above-described embodiment. The other embodiments are the same as the embodiment described above except for the matters described below. The embodiment described above and the other embodiments described below may be combined with each other as appropriate unless no contradiction arises. Note that the scope of the present invention is not limited to the embodiment described above or the other embodiments described below.

(1) A short-wavelength infrared sensor that detects short-wavelength infrared light may be provided instead of the temperature distribution sensor 122. In this case, the short-wavelength infrared sensor corresponds to the "detection device" according to the present invention.

(2) The travel apparatuses 111 may be of a wheel type, or a semi-crawler type.

(3) The above-described embodiment includes the visible light camera 121 as a member corresponding to the "imaging device" according to the present invention. However, the present invention is not limited to this configuration, and another sensor may be provided instead of the visible light camera 121 as long as the sensor can acquire a captured image.

For example, an infrared camera may be provided instead of the visible light camera 121. In this case, any type of sensor may be provided as a member corresponding to the "detection device" according to the present invention as long as the sensor is of a type different from an infrared camera.

Alternatively, for example, an ultraviolet camera may be provided instead of the visible light camera 121. In this case, any type of sensor may be provided as a member corresponding to the "detection device" according to the present invention as long as the sensor is of a type different from an ultraviolet camera.

(4) The obstacle detection unit 134 may be configured to perform obstacle detection only using the first detector 131, of the first detector 131 and the second detector 132, during a period in which the state determination unit 133 detects that the image capturing state of the visible light camera 121 is normal.

(5) The first detector 131 and the second detector 132 may be integrated as one detector. In this case, this detector may be configured to detect an obstacle around the machine body, using a neural network learned through deep learning, or configured to detect an obstacle around the machine body, using a method that does not employ a neural network.

(6) The first detector 131 may be configured to detect an obstacle around the machine body, using a method that does not employ a neural network.

(7) The second detector 132 may be configured to detect an obstacle around the machine body, using a method that does not employ a neural network.

(8) The temperature sensor 123 need not necessarily be provided.

(9) The illuminance sensor 124 need not necessarily be provided.

(10) The state determination unit 133 need not necessarily be provided.

(11) The obstacle detection unit 134 may be configured not to output a signal indicating that an obstacle is detected when an obstacle is detected by only either the first detector 131 or the second detector 132.

(12) The travel controller 135 may be configured not to perform at-detection stop control when an obstacle is detected by the obstacle detection unit 134.

(13) The warning controller 136 may be configured not to perform at-detection warning control when an obstacle is detected by the obstacle detection unit 134.

(14) The warning controller 136 need not necessarily be provided.

(15) The notification controller 137 may be configured not to perform at-detection notification control when an obstacle is detected by the obstacle detection unit 134.

(16) The notification controller 137 need not necessarily be provided.

(17) The target to be detected by the first detector 131 may be any target other than a person, or a plurality of types of targets.

(18) The target to be detected by the second detector 132 may be any target other than a person, or a plurality of types of targets.

(19) The notification controller 137 may be configured to display a notification screen on a display apparatus that is provided on the driver section 112, in at-detection notification control. In this case, the display apparatus corresponds to the "predetermined apparatus" according to the present invention. Thus, the operator on the driver section 112 is notified of the fact that an obstacle has been detected.

(20) The notification controller 137 may be configured to display a notification screen on a management terminal that is installed in a management center that is located outside the combine 101, in at-detection notification control. In this case, the management terminal corresponds to the "predetermined apparatus" according to the present invention. Thus, the user of the management terminal is notified of the fact that an obstacle has been detected.

(21) The present invention may be embodied as a control program that enables a computer to realize the functions of the members in the above-described embodiment. Alternatively, the present invention may be embodied as a recording medium having recorded thereon a control program that enables a computer to realize the functions of the members in the above-described embodiment. Alternatively, the present embodiment may be embodied as a control method for carrying out the operations performed by the members in the above-described embodiment, through one or more steps.

Note that the configurations disclosed in the above-described embodiments (including the other embodiments, the same applies to the following description) can be adopted in combination with configurations disclosed in yet another embodiment as long as no contradiction arises. The embodiments disclosed in the present description are examples, and the embodiments of the present invention are not limited to those embodiments, and can be appropriately modified without departing from the objective of the present invention.

INDUSTRIAL APPLICABILITY

The present invention is applicable to head-feeding type combines as well as normal-type combines. Furthermore, the present invention is applicable to grain-picking type corn harvesting machines, bean harvesting machine, and so on.

Also, the present invention can be used not only for normal-type combines, but also for various agricultural work machines such as head-feeding type combines, corn harvesting machines, rice transplanters, and tractors.

DESCRIPTION OF REFERENCE SIGNS

First Embodiment

1: Machine Main Body
15: Harvesting Unit
15A: Harvesting Header
15B: Shoveling Reel 23: Cutting Height Detection Unit (Height Detection Unit)
31: Selection Unit
32: Determination Unit
33: Obstacle Detection Unit
H: Height Position
H1: Preset Height Position
H2: Preset Height Position Second Embodiment 101: Combine (Agricultural Work Machine)
111: Travel Apparatus (Predetermined Apparatus)
121: Visible Light Camera (Imaging Device)
122: Temperature Distribution Sensor (Detection Device)
131: First Detector
132: Second Detector
133: State Determination Unit
134: Obstacle Detection Unit
135: Travel Controller (Apparatus Control Unit)
136: Warning Controller (Apparatus Control Unit)
137: Notification Controller (Apparatus Control Unit)
141: Horn (Predetermined Apparatus)
CT1: Mobile Communication Terminal (Predetermined Apparatus)

The invention claimed is:

1. A harvesting machine comprising:
a machine main body;
a harvesting unit that is provided forward of the machine main body and is capable of swinging upward and downward relative to the machine main body;
a height detection unit that is capable of detecting a height position at which the harvesting unit is located; and
an obstacle detection unit that is capable of detecting an obstacle that is located forward thereof in a travel direction,
wherein the obstacle detection unit comprises:
a first sensor and a second sensor that are provided at different positions in a vertical direction, and both output detection information regarding a detection area that is located forward thereof in the travel direction;
a selection unit that selects at least either the detection information from the first sensor or the detection information from the second sensor based on the height position of the harvesting unit; and
a determination unit that determines the obstacle based on the detection information selected by the selection unit.

2. The harvesting machine according to claim 1, wherein:
the first sensor and the second sensor are each provided on the machine main body, and
the selection unit selects the detection information from whichever one of the first sensor and the second sensor that is located at a lower position when the height position of the harvesting unit is higher than a preset height position that is determined in advance, and selects the detection information from the other of the first sensor and the second sensor that is located at a higher position when the height position of the harvesting unit is lower than the preset height position.

3. The harvesting machine according to claim 1, wherein:
the first sensor and the second sensor are each provided on the machine main body,
the harvesting unit comprises a harvesting header that is capable of swinging upward and downward relative to the machine main body, and a shoveling reel that is capable of swinging upward and downward relative to the harvesting header, and
the selection unit selects at least either the detection information from the first sensor or the detection information from the second sensor based on a height position of the harvesting header and a height position of the shoveling reel.

4. The harvesting machine according to claim 1, wherein:
the first sensor and the second sensor are each provided on the machine main body,
the harvesting unit comprises a harvesting header that is capable of swinging upward and downward relative to the machine main body, and a shoveling reel that is capable of changing a position thereof forward and rearward relative to the harvesting header, and
the selection unit selects at least either the detection information from the first sensor or the detection information from the second sensor based on a height position of the harvesting header and a position of the shoveling reel in a front-rear direction.

5. The harvesting machine according to claim 1, wherein:
the first sensor and the second sensor are each provided on the harvesting unit, and
at least either the first sensor or the second sensor is configured to change a sensing direction thereof based on the height position of the harvesting unit.

6. A computer program product comprising at least one non-transitory computer-readable storage medium including an obstacle determination program for a harvesting machine, the harvesting machine comprising:
a machine main body;
a harvesting unit that is provided forward of the machine main body and is capable of swinging upward and downward relative to the machine main body; and
a first sensor and a second sensor that are provided at different positions in a vertical direction, and each output detection information regarding a detection area that is located forward thereof in a travel direction,
wherein the obstacle determination program, when executed by a computer comprising at least on processor, is configured to cause the computer to perform:
a height detection function of detecting a height position at which the harvesting unit is located; and
an obstacle detection function of detecting an obstacle that is located forward in the travel direction, and
wherein the obstacle detection function comprises:
a selecting function of selecting at least either the detection information from the first sensor or the detection information from the second sensor based on the height position of the harvesting unit; and
a determining function of determining the obstacle based on the detection information selected using the selecting function.

7. A non-transitory computer-readable recording medium on which an obstacle determination program is recorded, the obstacle determination program being for a harvesting machine comprising:
a machine main body;
a harvesting unit that is provided forward of the machine main body and is capable of swinging upward and downward relative to the machine main body; and
a first sensor and a second sensor that are provided at different positions in a vertical direction, and each output detection information regarding a detection area that is located forward thereof in a travel direction, wherein the obstacle determination program recorded on the recording medium, when executed by a computer comprising at least one processor, causes the computer to perform:

a height detection function of detecting a height position at which the harvesting unit is located; and an obstacle detection function of detecting an obstacle that is located forward in the travel direction, and wherein the obstacle detection function comprises:

a selecting function of selecting at least either the detection information from the first sensor or the detection information from the second sensor based on the height position of the harvesting unit; and a determining function of determining the obstacle based on the detection information selected using the selecting function.

8. An obstacle determination method for a harvesting machine comprising:

a machine main body;

a harvesting unit that is provided forward of the machine main body and is capable of swinging upward and downward relative to the machine main body; and a first sensor and a second sensor that are provided at different positions in a vertical direction, and each output detection information regarding a detection area that is located forward thereof in a travel direction, the obstacle determination method comprising:

a height detection step of detecting a height position at which the harvesting unit is located; and an obstacle detecting step of detecting an obstacle that is located forward in the travel direction, wherein the obstacle detection step comprises:

a selecting step of selecting at least either the detection information from the first sensor or the detection information from the second sensor based on the height position of the harvesting unit; and a determining step of determining the obstacle based on the detection information selected in the selecting step.

* * * * *